(12) United States Patent
Vosshall et al.

(10) Patent No.: US 9,679,008 B2
(45) Date of Patent: *Jun. 13, 2017

(54) SYSTEM AND METHOD FOR PROVIDING HIGH AVAILABILITY DATA

(71) Applicant: Amazon Technologies, Inc., Reno, NV (US)

(72) Inventors: Peter S. Vosshall, Bainbridge Island, WA (US); Swaminathan Sivasubramanian, Seattle, WA (US); Giuseppe deCandia, Seattle, WA (US); Deniz Hastorun, Seattle, WA (US); Avinash Lakshman, Mercer Island, WA (US); Alex Pilchin, Seattle, WA (US); Ivan D. Rosero, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 429 days.

This patent is subject to a terminal disclaimer.

(21) Appl. No.: 14/257,757

(22) Filed: Apr. 21, 2014

(65) Prior Publication Data

US 2014/0229432 A1 Aug. 14, 2014

Related U.S. Application Data

(63) Continuation of application No. 13/084,495, filed on Apr. 11, 2011, now Pat. No. 8,706,688, which is a
(Continued)

(51) Int. Cl.
*G06F 17/00* (2006.01)
*G06F 17/30* (2006.01)
*G06F 11/20* (2006.01)

(52) U.S. Cl.
CPC .... *G06F 17/30371* (2013.01); *G06F 17/3033* (2013.01); *G06F 17/30309* (2013.01);
(Continued)

(58) Field of Classification Search
None
See application file for complete search history.

(56) References Cited

U.S. PATENT DOCUMENTS 5,924,096 A 7/1999 Draper et al.
6,047,323 A 4/2000 Krause
(Continued)

OTHER PUBLICATIONS

2003 Definition of "hash table" from: http://www.techweb.com/encyclopedia/shared/printArticlePageSrc.jhtml?term-=hash%20table, pp. 1-2.
(Continued)

*Primary Examiner* — Scott A Waldron
*Assistant Examiner* — Mellissa M Ohba
(74) *Attorney, Agent, or Firm* — Robert C. Kowert; Meyertons, Hood, Kivlin, Kowert & Goetzel, P.C.

(57) ABSTRACT

A computer-implemented data processing system and method includes storing a data set at a plurality of data centers. The data centers and hosts within the data centers may be organized according to a multi-tiered ring arrangement. A hashing arrangement may be used to implement the ring arrangement to select the data centers and hosts where the writing and reading of the data sets occurs. Version histories may also be written and read at the hosts and may be used to evaluate causal relationships between the data sets after the reading occurs.

20 Claims, 20 Drawing Sheets

Related U.S. Application Data continuation of application No. 11/508,129, filed on Aug. 22, 2006, now Pat. No. 7,925,624, which is a continuation-in-part of application No. 11/394,648, filed on Mar. 31, 2006, now Pat. No. 7,707,136.

(52) U.S. Cl.
CPC .. *G06F 17/30477* (2013.01); *G06F 17/30575* (2013.01); *G06F 11/2097* (2013.01); *G06F 2201/82* (2013.01)

(56) References Cited

U.S. PATENT DOCUMENTS

| | | |
|---|---|---|
| 6,434,662 B1 | 8/2002 | Greene et al. |
| 6,523,036 B1 | 2/2003 | Hickman et al. |
| 6,597,700 B2 | 7/2003 | Golikeri et al. |
| 6,748,559 B1 | 6/2004 | Pfister et al. |
| 7,707,136 B2 | 4/2010 | Vosshall et al. |
| 2005/0108247 A1 | 5/2005 | Heinla et al. |
| 2007/0168967 A1 | 7/2007 | Chopra et al. |

OTHER PUBLICATIONS

Yakima Technologies Web site, .COPYRGT. 2008, <http://www.akamai.com> [sample pages retrieved Jul. 28, 2008], pp. 1-16.

Byers, J., et al., "Fast Approximate Reconciliation of Set Differences," Boston University, College of Arts and Sciences Technical Reports, Boston, Mass., Jul. 11, 2002, pp. 1-16.

Dilley, J., et al., "Globally Distributed Content Delivery," IEEE Internet Computing 6(5):50-58, 2002.

Karger, D., et al., "Web Caching With Consistent Hashing," Proceedings of 8th International World Wide Web Conference,Toronto, Canada, May 11-14, 1999, pp. 1203-1213.

Demers, A., et al., Epidemic Algorithms for Replicated Database Maintenance, Proceedings of the Sixth Annual ACM Symposium on Principles of Distributed Computing, Aug. 10-12, 1987, pp. 1-12, Vancouver, British Columbia, Canada.

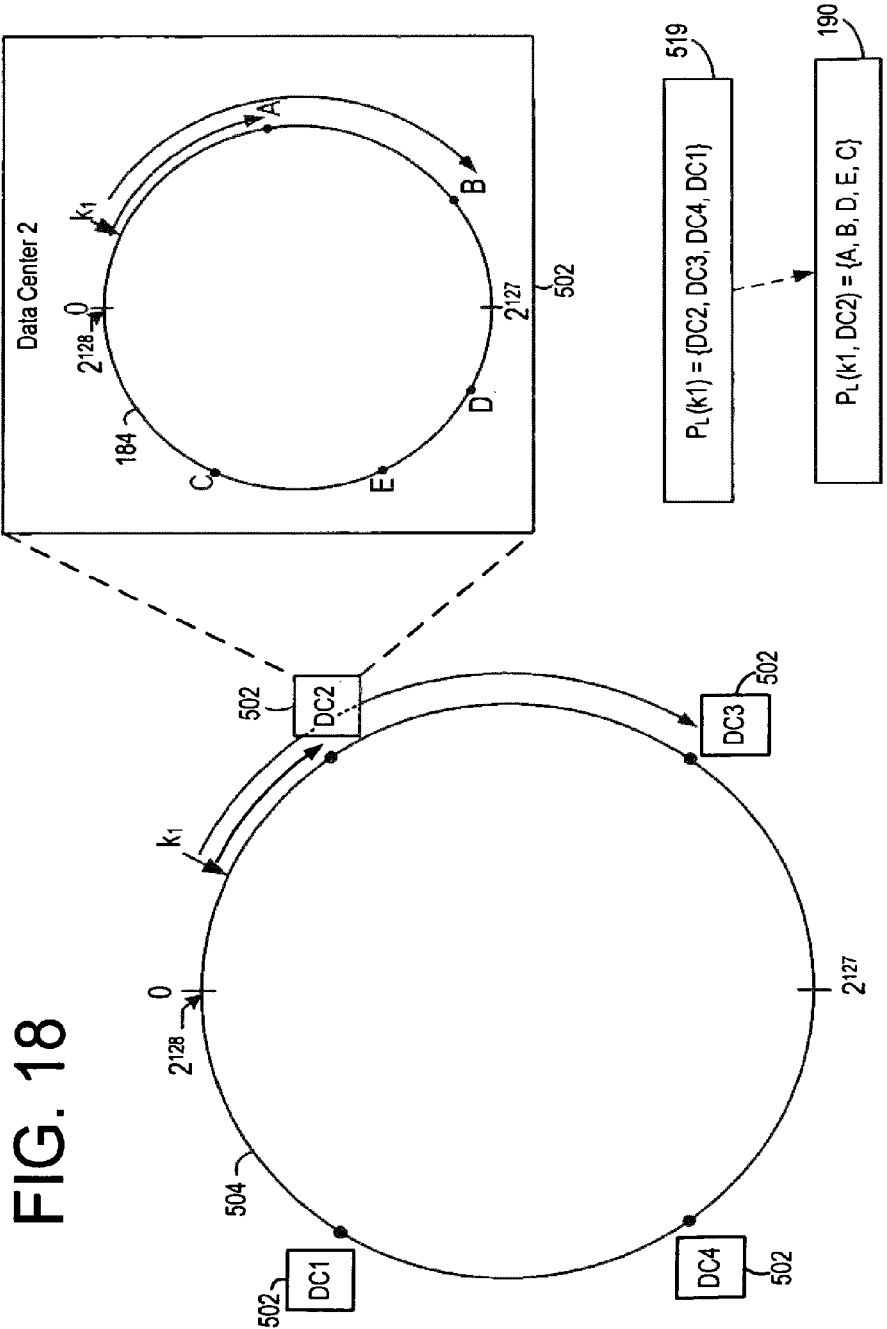

SYSTEM AND METHOD FOR PROVIDING HIGH AVAILABILITY DATA

CROSS-REFERENCE TO RELATED APPLICATIONS

This application is a continuation of U.S. patent application Ser. No. 13/084,495, entitled "System and Method for Providing High Availability Data," which is a continuation of U.S. patent application Ser. No. 11/508,129, entitled "System and Method for Providing High Availability Data," filed Aug. 22, 2006, now U.S. Pat. No. 7,925,624, which is a continuation-in-part of U.S. patent application Ser. No. 11/394,648, entitled "System and Method for Providing High Availability Data," filed Mar. 31, 2006, hereby now U.S. Pat. No. 7,707,136, the entirety of which are incorporated herein by reference.

BACKGROUND

Enterprise computing environments often need to access data relating to a particular business application. In order to avoid a single point of failure, data is often stored at multiple hosts at different locations (e.g., different locations within a given data center, different data centers, and so on). Thus, for example, if a particular data set becomes unavailable from one host (e.g., due to host failure, due to a network partition or other network failure, and so on), a client process may access the data at another host. The individual hosts may not be highly available, but the combination of the individual hosts provides a more highly available solution.

When storing the same data at multiple locations, a problem that is encountered is maintaining consistency between the various copies of the data. The state of the data set as it exists at one host may not be consistent with the state of the data set as it exists at the other host. For example, if a client process has made changes to a data set at one host, and the data set then becomes unavailable from that host, the changes that have been made in the copy of the data set at that host may be lost, at least temporarily. A recent version of the data set may be obtained from another host. However, if the client process starts operating on the data set from the other host, a further problem arises in that two versions of the data set may potentially be created, each with changes that are not reflected in the other data set.

Accordingly, an on-going need exists for systems and methods that are capable of providing highly available data. It should be appreciated that, although certain features and advantages are discussed, the teachings herein may also be applied to achieve systems and methods that do not necessarily achieve any of these features and advantages.

SUMMARY

An embodiment relates to a computer-implemented data processing method comprising storing a data set at hosts within a plurality of data centers. The data centers and hosts within the data centers may, for example, be organized according to a multi-tiered ring arrangement. In an embodiment, a hashing arrangement is used to implement the ring arrangement to select the data centers and hosts where the writing and reading of the data sets occurs. In another embodiment, version histories are also written and read at the hosts and are used to evaluate causal relationships between the data sets after the reading occurs.

It should be understood that the detailed description and specific examples, while indicating preferred embodiments of the present invention, are given by way of illustration and not limitation. Many modifications and changes within the scope of the present invention may be made without departing from the spirit thereof, and the invention includes all such modifications.

BRIEF DESCRIPTION OF THE DRAWINGS

FIG. 18 is a diagram of a hash operation used in connection with data replication and load balancing in the system of FIG. 17 according to an embodiment.

FIG. 19 is a diagram of a data center and host preference lists used in the system of FIG. 17 according to an embodiment.

DETAILED DESCRIPTION

I. System Architecture

Figure 1:
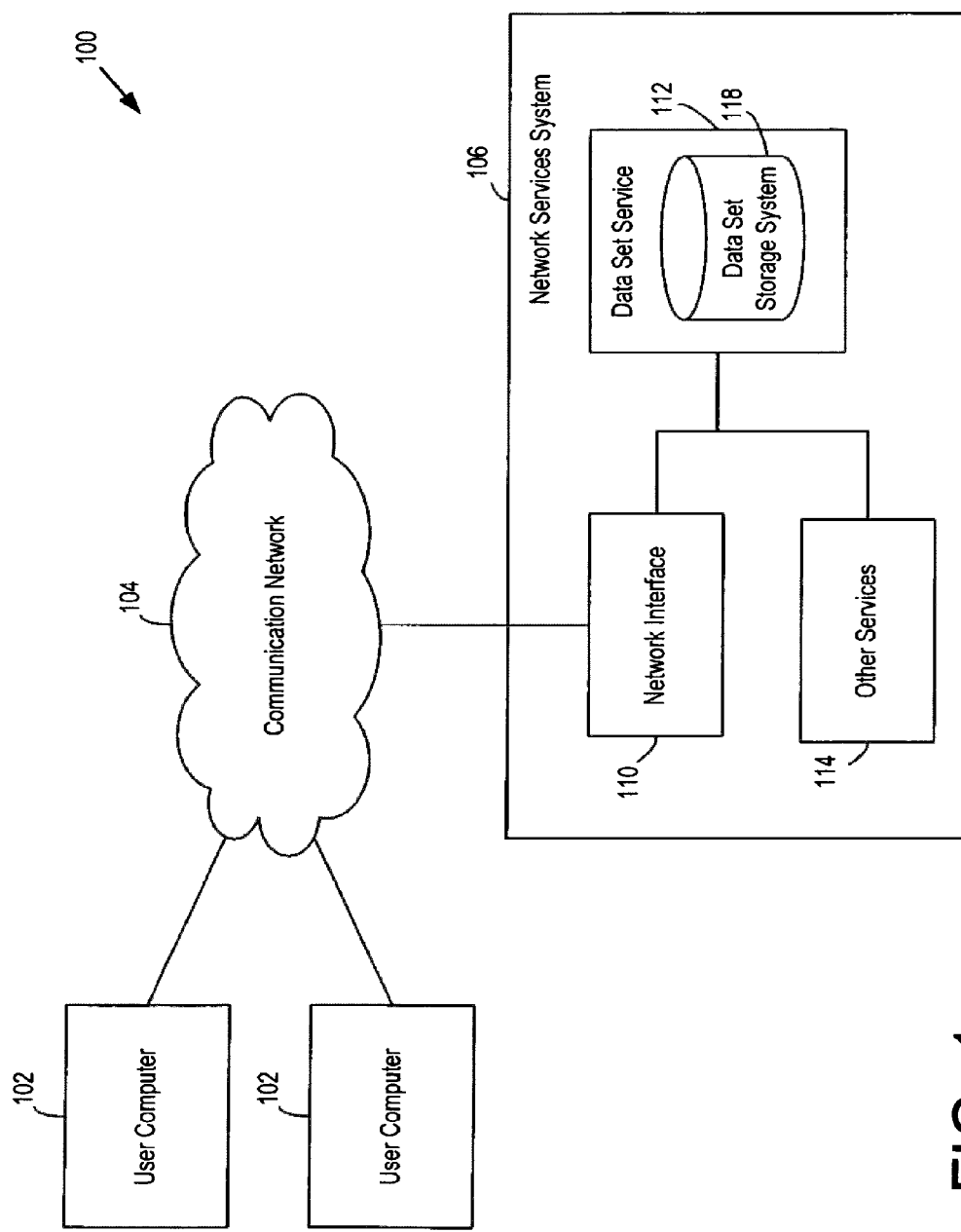
FIG. 1 is a block diagram of a data processing system according an embodiment.

Referring to FIG. 1, a data processing system 100 according to an embodiment is shown. Data processing system 100 includes user computers 102, communication network 104, and a network services system 106. User computers 102 may access network services system 106 via communication network 104. Network services system 106 includes network interface 110, a data set service 112, and one or more other services 114. The network interface 110 receives data from and provides data to the user via communication network 104. For example, the network interface 110 may provide the users computers 102 with access to data sets maintained by the data set service 112 as well as to other data generated and/or maintained by the other services 114.

Data set service includes a data storage system 118 which may store the data sets. The data states may change over time based on user interaction and/or based on other changes in system 106. Herein, the term "data set" refers to any data that may change over time. For example, each data set may include one or more items that may be added, removed, and/or modified from the data set. Data storage system 118 is configured to store information in a highly available manner so that, in the event of a system fault (e.g. host failure, network failure, and so on), the data sets remain available with a high level of consistency, as discussed below. In an embodiment, the data storage system 118 is implemented using a Berkeley database transaction data storage system.

Figure 2:
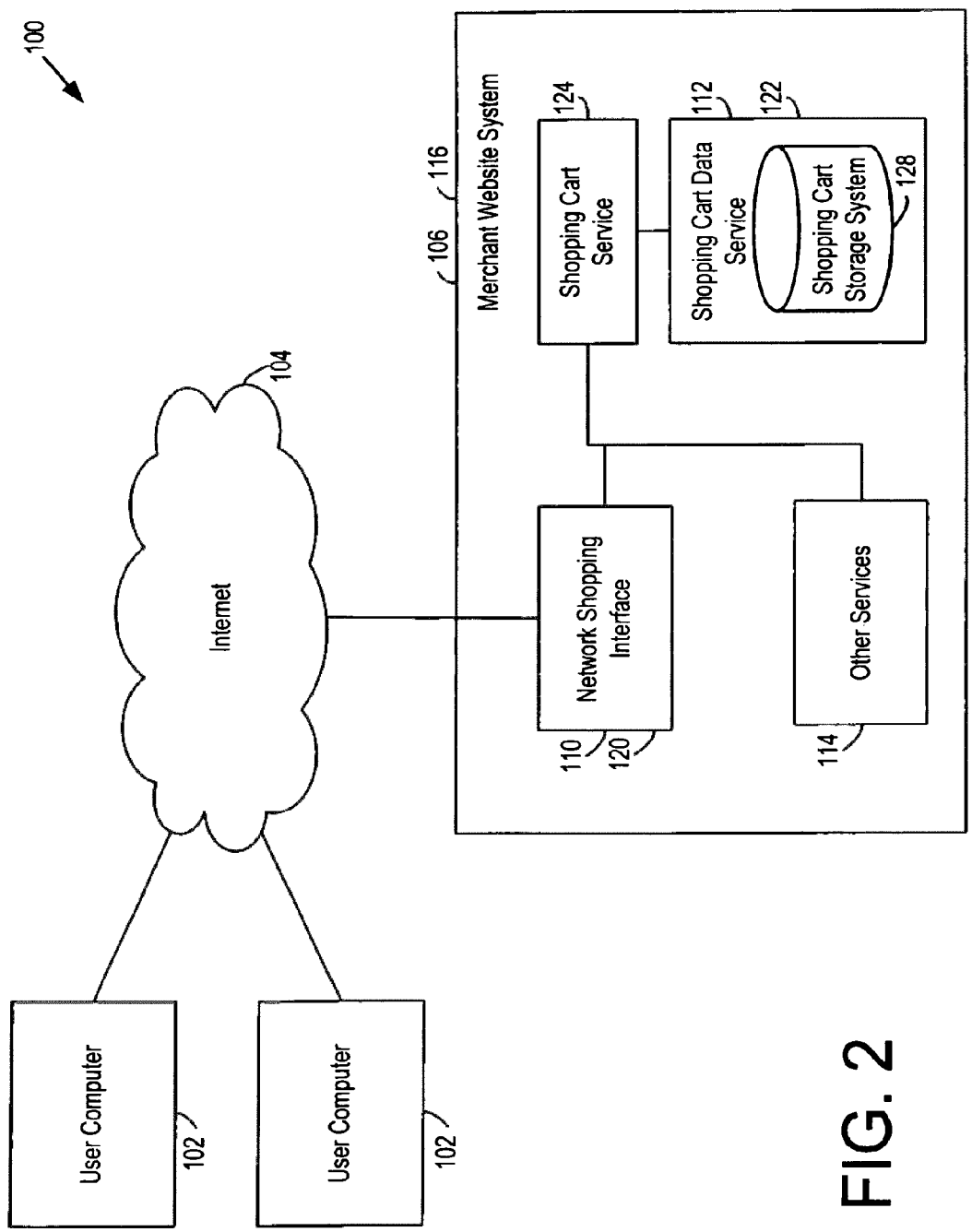
FIG. 2 is a block diagram of another data processing system according an embodiment.

Referring now also to FIG. 2, FIG. 2 provides another example of a data processing system 100. In the example of FIG. 2, network services system 106 is a merchant website system 116 and the network interface 110 is a network shopping interface 120. Merchant website system 116 may, for example, be implemented in a distributed computing environment comprising thousands of hosts or more. Merchant website system 116 may provide a merchant website (e.g., an on-line retail website) accessible to a user operating a user computer 102 to shop for items (e.g., goods, services, subscriptions, etc.). In such an embodiment, network shopping interface 120 may provide users with graphical and/or text data on the website to facilitate the display and/or sale of items. The data provided to users may include item information such as pricing, dimensions, availability, items currently selected for purchase, and so on. Merchant shopping interface 120 may also be configured to receive data from user, such as data indicating items the user is interested in, data needed to complete a transaction, and so forth.

In the example of FIG. 2, data set service 112 is shown to be a shopping cart data service 122 that maintains lists of items selected for purchase or possible purchase by users of the website. In such an example, each data set may be a shopping cart related to a specific customer. The data set may include item identification information for items in the shopping cart, item information for items that a user may have selected but not yet purchased, quantity information of items in the shopping cart, and so on. The shopping cart data service 122 may be accessed through a shopping cart service 124, which may comprise other business logic associated with shopping carts. The website system 116 may publish web pages for users of the website that include all or a portion of the data set, e.g., a webpage showing all or a portion of a user's shopping cart. In other example embodiments, the data sets may comprise other data that may be collected by website system 116, based on the interaction of a user, or for the convenience of the visitor or to facilitate operation of the website. For example, the data set service 112 may also maintain data sets relating to specific entities (e.g., data sets relating to different users of a website, different sessions on the website, different transactions conducted on the website, different items offered by the website, different categories of items offered by the website, different advertisements published on the website, different pages of the website, and so on). As will also be appreciated, although FIG. 2 shows a website system, the data processing system 100 may be used in other applications.

Referring again to FIG. 1, data set service 112 may be used both in connection with local processes and remote processes. In the context of remote processes, read and write requests for data set service 112 may be received from a remote process by way of communication network 104. For example, the network services system 106 may offer services that are accessible to remote processes through an application programming interface (API) across the Internet. Such service requests may be made by third parties, for example, to assist in the operation of their own data processing systems.

Figure 3:
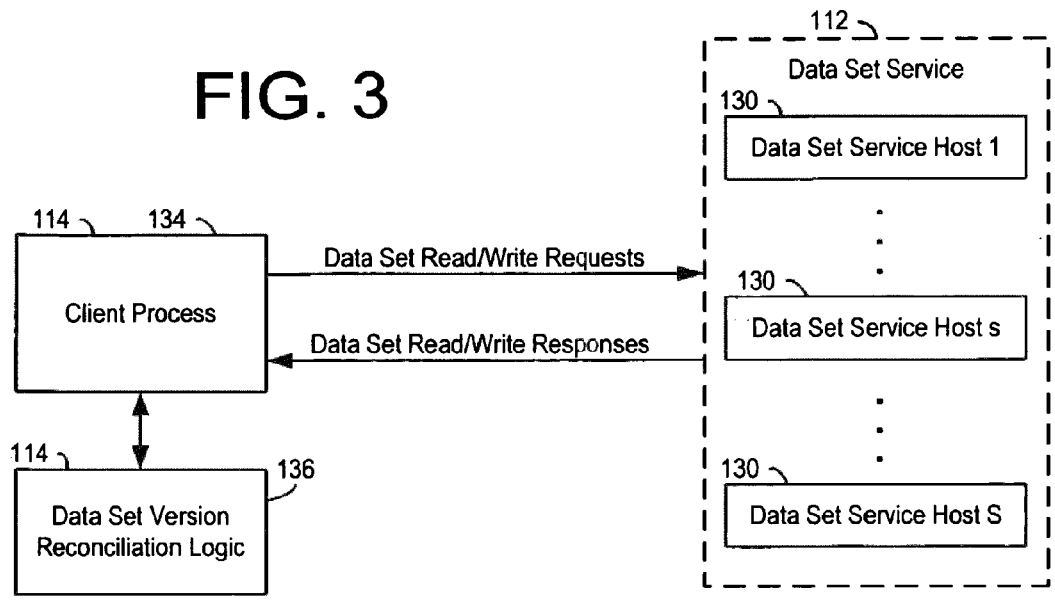
FIG. 3 is a block diagram showing a data set service of FIG. 1 in greater detail according to an embodiment.

Referring now to FIGS. 3-6, construction and operation of the data set service 112 is shown in greater detail. As shown in FIG. 3, the data set service 112 may comprise a plurality of hosts 130. Herein, the term "plurality" means two or more. For example, the data set service 112 may comprise tens, hundreds, or thousands of hosts 130 or more. In an embodiment, each host 130 is functionally equivalent (e.g., executes the same code, or executes related versions of the same code). Each host 130 may include stored program logic configured to perform the operations described in FIGS. 3-16, below. As will be described below, the data set storage system 118 may be distributed across the hosts 130, such that each host 130 stores a portion of the data sets. Each host 130 stores a subset of the data (of the key-value pairs) and the system attempts to maintain N replicas of each data set (where N is a positive integer representing the replication factor or the number of times to replicate the data set). The value N is configurable and affects both the durability, availability and consistency of data. If there are S physical hosts in the system, then the overall system 106 comprises S≥N physical hosts (although the smaller S, the lower the total system availability), and each host 130 stores approximately N/S of the data sets. Alternatively, if heterogeneous hosts 130 are used, then each host 130 stores a number of data sets which is proportional to the weight of the respective host 130 weight in the system 106. The weight of each host 130 may be determined based on the resources of each host 130. For example, the weight of each host 130 may be determined based on the relative power of each host 130 (e.g., as determined based on processing capacity, storage capacity, and/or network capacity), such that more powerful hosts 130 may store more data sets. The value of N may also be made configurable on a per data set or per data type basis, for example, to permit availability/durability to be configured on a per data set or per data type basis.

Figure 4:
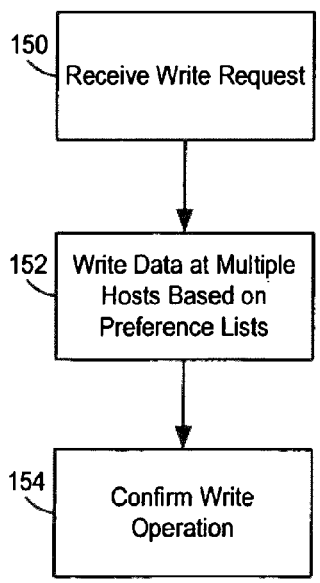
FIG. 4 is a flowchart of a write operation implemented by the system of FIG. 1 according to an embodiment.

As shown in FIG. 4, to store data received from a client process 134 (e.g., one of the services 114), the data set service 112 receives a write request from the client process 134 (step 150) and then responds by writing the data at multiple hosts 130 (step 152). (For purposes of this application, the term "client process" refers to any program logic that may request data sets from any other program logic, e.g., herein, from the data set service 112.) In an embodiment, the data is written at multiple hosts 130 based on preference lists, as described below. After the data is written, a response is sent to the client process 134 confirming that the write operation has been performed (step 154). Exemplary write operations are described in greater detail in connection with FIGS. 7-12; FIGS. 13A-13B, and FIGS. 14A-14B.

Figure 5:
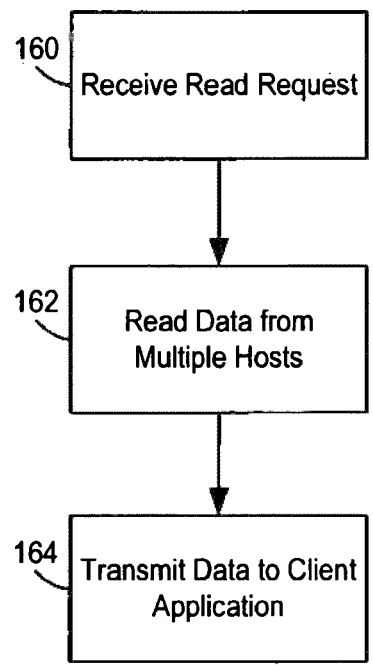
FIG. 5 is a flowchart of a read operation implemented by the system of FIG. 1 according to an embodiment.

As shown in FIG. 5, to provide data to a client process 134, the data set service 112 receives a read request from the client process 134 (step 160) and then responds by reading the data at multiple hosts 130 (step 162). After the data is read, a response is sent to the client process 134 confirming that the read operation has been performed and including the requested data (step 164). Exemplary read operations are described in greater detail in connection with FIGS. 15A-15B.

Figure 6:
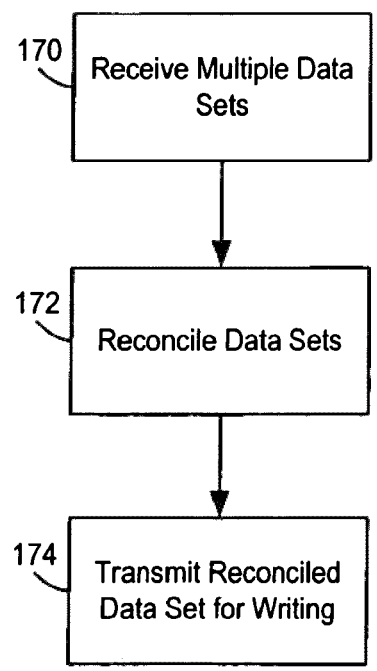
FIG. 6 is a flowchart of a data reconciliation and update operation implemented by the system of FIG. 1 according to an embodiment.

With regard to FIG. 6, when all relevant network connections and hosts 130 are healthy (e.g., available and responsive), the hosts 130 involved in the read operation typically provide consistent data. However, when one or more of the network connections or hosts 130 is troubled or failed, the hosts 130 may provide different versions of the same data set. Thus, as shown in FIG. 6, after the data sets are received at the client process (step 170), the data sets may be reconciled (step 172). The reconciled data set may then be transmitted to the data service 112 for storage (step 174). As described in greater detail below, the existence of inconsistent versions of the same data set may be detected using a data versioning arrangement. The data versioning arrangement may also be used by version reconciliation logic 136 (provided as part of or in connection with client process 134, as shown in FIG. 3) to reconcile the inconsistent versions. An example data versioning arrangement is described in greater detail below in connection with FIG. 16.

II. Coordination of Read/Write Operations

A. Partitioning Data Sets Over Hosts

Figure 7:
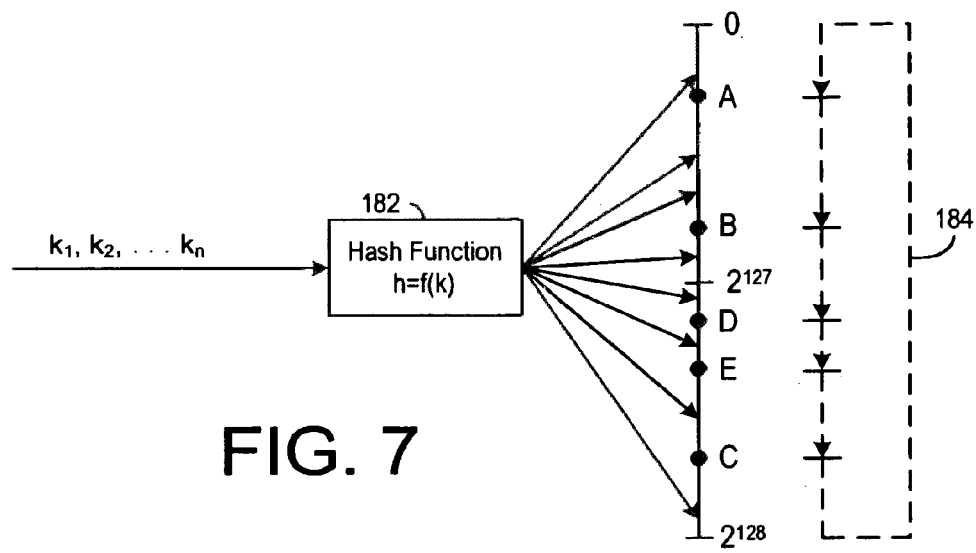
FIG. 7 is a diagram of a hash operation used in connection with data replication and load balancing in the system of FIG. 1 according to an embodiment.
Figure 8:
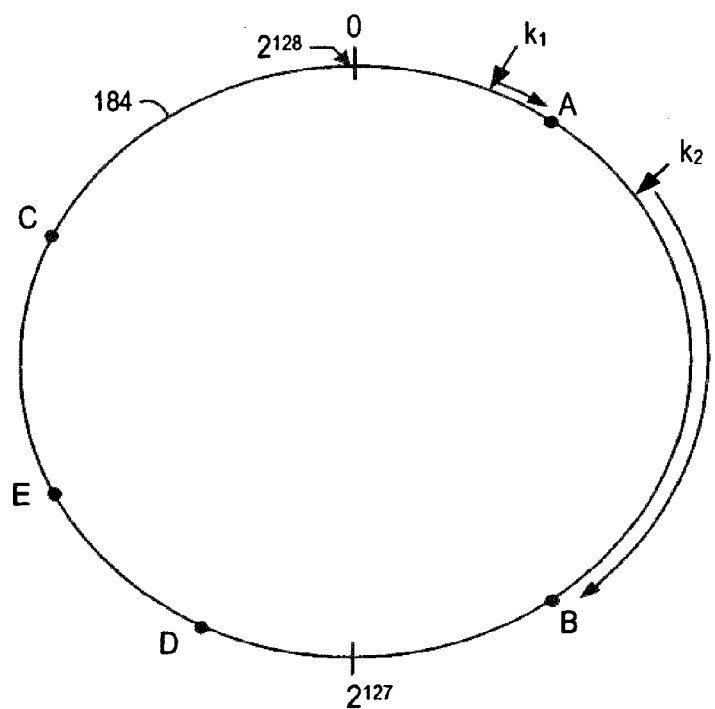
FIG. 8 is another diagram of the hash operation shown in FIG. 7 according to an embodiment.

Referring to FIGS. 7-8, in an embodiment, data set service 112 includes a mechanism to partition data sets over hosts 130 in system 106. In an embodiment, described below, a consistent hashing arrangement may be used to store data sets such that data is spread relatively evenly over the hosts 130. In other embodiments, other data partitioning arrangements may be used.

Referring first to FIG. 7, in an embodiment, in order to access the data stored by the data set service 112 (e.g., via a read operation or a write operation), client processes transmit data requests that include a key for the data set to which each request refers. For example, in the context of a shopping cart application, the key may be generated based on the user ID of the user to whom the shopping cart is related (e.g., the user ID may be used as the key). The keys may be any data value that is associated with a data set and that is suitable for use as an input to a hash function. As shown in FIG. 7, the key is applied to hash function 182 which in turn generates a hash value h as a function of the key. In an embodiment, the hash function 182 achieves an approximately uniform spread of hash values over a hash range. In the illustrated embodiment, the hash values are shown to be spread over the hash range $\{0, 2^{128}\}$, however, any number of hash values, or effectively any size hash range, may be used.

Upon becoming active participants in the data set service 112, each host 130 is assigned a set of positions over the hash range. For purposes of explanation, it is assumed in the remainder of the discussion herein that there are five hosts 130 which implement the data set service 112, shown as host A, host B, host C, host D and host E. It will be appreciated that, in practice, data set service 112 may be implemented by tens, hundreds, or thousands of hosts 130 or more.

Referring to FIG. 8, FIG. 8 shows the manner in which responsibility for a read operation or a write operation is assigned to a particular host 130 based on a hash value. Each host 130 is responsible for read/write operations in connection with hash values extending from its own position in the hash range to the position of the previous host 130. For example, if hosts A, B, C, D and E are positioned at hash values $h_1$, $h_2$, $h_3$, $h_4$, and $h_5$, respectively, then host B is responsible for the range of hash values $h_1<h\leq h_2$, host C is responsible for the range of hash values $h_2<h\leq h_3$, and so on. The assignment of responsibility "wraps around" for host A, that is, host A is responsible for the range of hash values $h_5<h\leq 2^{128}$ and $0\leq h\leq h_1$. In operation, for example, data sets with keys $k_1$ and $k_2$ are assigned to hosts 130 by hashing the keys $k_1$ and $k_2$ to yield their position on ring 184, and then walking ring 184 clockwise to find the first host 130 with a position larger than the hashed key of the data set. In the case of key $k_1$, the first host with a larger position, which the corresponding data set is assigned to, is host A. In the case of key $k_2$, the first host with a larger position, which the corresponding data set is assigned to, is host B.

Figure 9:
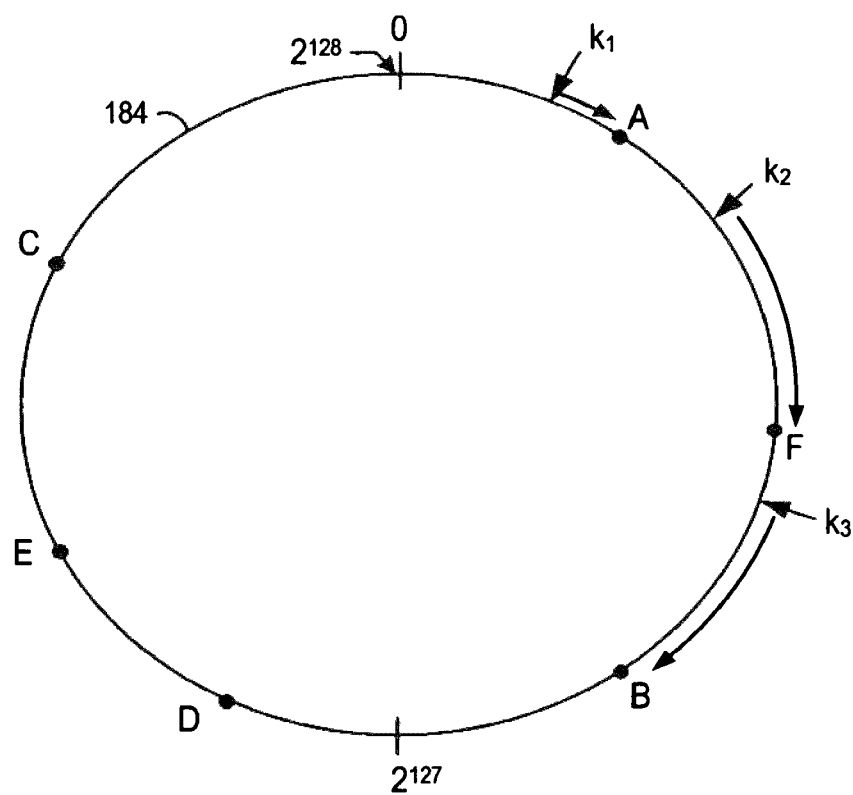
FIG. 9 is a diagram showing incremental scalability features of the system of FIG. 1 according to an embodiment.

The arrangement shown in FIGS. 7-8 results in each host 130 being responsible for the region of the ring 184 between it and its predecessor host 130 on the ring 184. For example, host B is responsible for the portion of the ring 184 between it and host A. If a host 130 enters or leaves, it only affects the responsibilities of its immediate successor on the ring 184; all other hosts 130 are unaffected. This is shown in FIG. 9, in which the addition of a host F impacts the responsibilities of its immediate successor on the ring 184, host B, but not the responsibilities of other hosts 130, such as host A. Thus, individual hosts 130 may be added or removed without a total remapping of the partitioning of data sets to hosts 130, thereby promoting incremental scalability.

1. Data Replication

Figure 10:
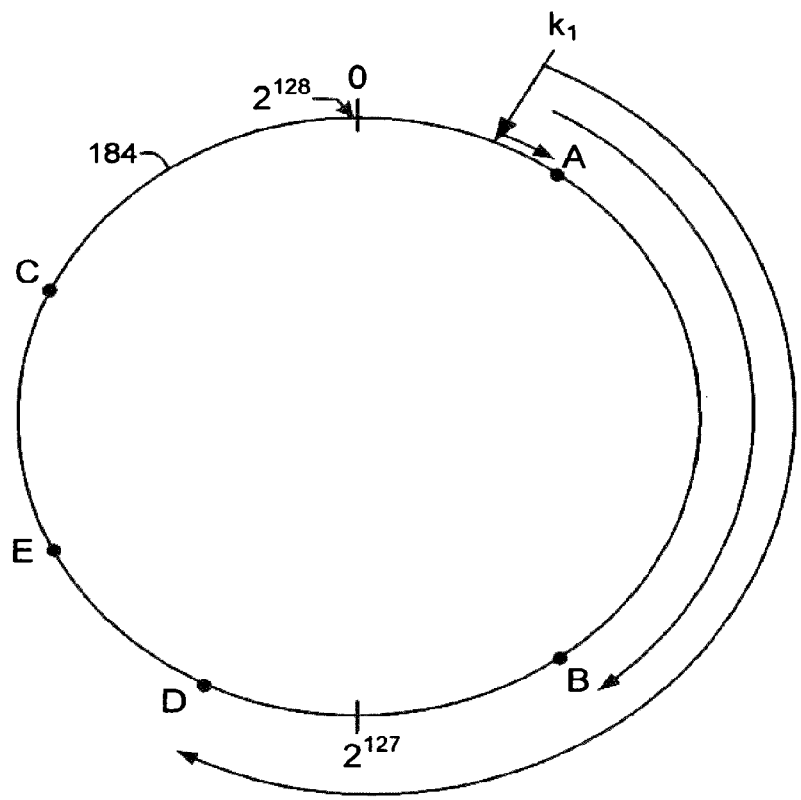
FIG. 10 is a diagram of a data replication arrangement used in the system of FIG. 1 according to an embodiment.
Figure 11:
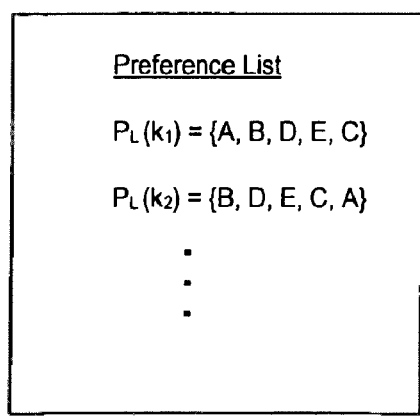
FIG. 11 is a diagram of a host preference list used in the system of FIG. 1 according to an embodiment.

Referring now to FIGS. 10-11, the hashing arrangement of FIGS. 7-8 may be used to support data replication. In FIG. 10, rather than the data set being assigned merely to the immediate successor host 130 on the ring 184, the data set is assigned to the first N successor hosts 130. As described below, data set service 112 may operate to ensure that there are N replicas of the data among the hosts 130, and each host 130 is responsible for the region of the ring 184 between itself and its Nth predecessor.

As shown in FIG. 1, in such an arrangement, each key has a preference list 190 of hosts 130, which is the order that each of the hosts 130 is first encountered while moving clockwise around the ring 184 from the hash value generated based on the key. The preference list 190 represents the preferred order of hosts 130 used for accessing (e.g., reading or writing) a data set. When all hosts 130 are healthy, the top N hosts in the preference list 190 store the data set. If a particular host 130 happens to fail, or if there is a network partition, the data set may temporarily be stored at a host 130 that is lower ranked in the preference list 190. If multiple hosts 130 fail, then the data set may be stored at multiple lower ranked hosts 130 in the preference list 190. With N=3, a client process 134 accessing a data set associated with key $k_1$ reads or writes to hosts A, B, and D (and then E and then C, if any earlier hosts are unavailable) in that order, as can be seen by moving clockwise around ring 184 from the position of key $k_1$. A client process 134 accessing a data set associated with key $k_2$ reads or writes to hosts B, D, E, (and then C and then A, if any earlier hosts are unavailable) in that order, as can be seen by moving clockwise around ring 184 from the hash position of key $k_2$. As indicated above, the value N is a configurable value; thus, more hosts 130 may be added to system 106 to permit more replication of data sets. Accordingly, the level of availability of data sets is configurable and may be made as high as desired using the appropriate number of hosts 130.

When all hosts 130 are available, successive operations on the same data set access the same set of N hosts, and are therefore consistent (i.e. an operation accesses the same data that was read/written by the previous operation on the same key). When there are network or host failures, successive operations to the same data set may access different sets of hosts 130; however, the operations may still be consistent as long as there is some overlap in the sets of hosts that are accessed. For example, a first operation on key $k_1$ may access hosts A, B, and D. Later, if host B is unavailable, a second operation on $k_1$ may access hosts A, D, and E. Thus, by accessing available hosts 130 that are highest in the preference list 190, minor changes in the availability of hosts from operation to operation do not negatively affect consistency because subsequent accesses may involve overlapping hosts. The availability of at least N hosts must change during two successive operations in order for there to be no overlap between the host sets (resulting in an inconsistency). As indicated above, the value N is a configurable value; accordingly, a probabilistic guarantee of consistency is configurable and may be made as high as desired. This includes probabilistic guarantees of both global consistency (the system response reflects the absolute latest change made to the data) and subjective consistency (the system's response reflects the latest changes made by the client making the current request).

In an embodiment, client operations on data sets may be serviced at multiple locations (e.g., servers). Furthermore, successive operations on the same data set may be serviced by different servers. In an embodiment, in order to access the hosts 130 that store a given data set, a server stores information regarding the host positions in the hash space (in order to compute the preference list 190) as well as the availability of hosts 130 (in order to select the N available hosts that are highest in the preference list 190). In the presence of network or host failures, different servers may store different information regarding the availability of hosts. In the presence of hosts joining or leaving the system, different servers may store different information regarding the set positions in the hash space. For example, server X may not be aware that host A has joined the data set service 112. Hence, in servicing an operation on a data set with key $k_1$, server X may access hosts B, D, and E. Another server Y may already be aware of both host A and the hash positions of host A. Based on this information, when servicing a subsequent operation on key $k_1$, server Y may access hosts A, B, and D. Thus, by accessing available hosts 130 that are highest in the preference list 190, the probability of accessing at least one host during write and read operations is increased. Accordingly, minor differences in information regarding host availability and hash positions from server to server do not negatively impact consistency during successive operations. As indicated above, this probabilistic guarantee of consistency is determined by the value of N.

In an embodiment, the preference list 190 may be implemented by way of operation of hashing function 182 (e.g., without being separately stored). In another embodiment, the preference list 190 may be stored. As will be appreciated, other factors may be taken into account when constructing the preference list 190. The preference list 190 may be manually or automatically constructed to take into account such factors. For example, in order to further improve availability and durability, preference list 190 may be constructed so as to include hosts 130 in the same preference list 190 which have a relatively low probability of correlated failure. For example, if system 100 is distributed over multiple networks, there may be sets of hosts 130 that are unlikely to fail together. Hence, system 100 can maximize availability and durability by choosing the N hosts for the N replicas of a data set such that they have low correlated failures. Likewise, low failure correlation may also exist where hosts 130 are running on different hardware, using different program logic implementations, running in geographically diverse areas, and combinations thereof. For example, when moving clockwise around ring 184, a set of rules may be applied to assess whether an encountered host 130 meets any additional criteria that are desired to be considered. If the encountered host 130 does not meet the additional criteria, the search for an available host may continue onward around ring 184 until a host is encountered that does meet the additional criteria.

Other arrangements may also be used to achieve geographic diversity. For example, rather than using a single ring 184, a tiered ring arrangement may be used. An example of such an arrangement is described in greater detail below in connection with FIGS. 17-25.

2. Load Balancing

Figure 12:
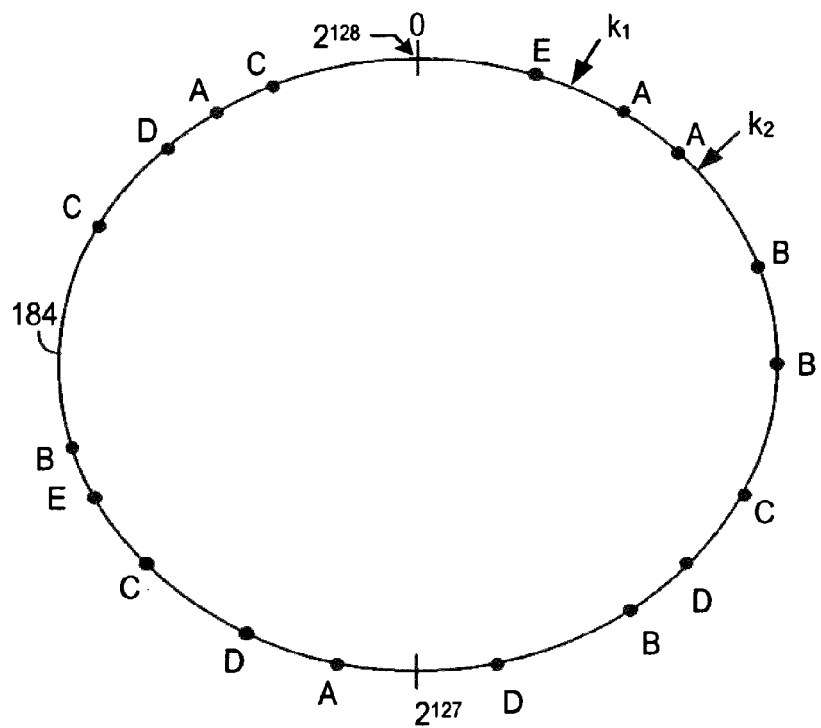
FIG. 12 is a diagram of a load balancing arrangement used in the system of FIG. 1 according to an embodiment.

Referring to FIG. 12, the hosts 130 may be assigned to multiple positions on the ring 184 in order to promote load balancing, that is, to avoid non-uniform data and load distribution that may otherwise be created by a random position assignment of each host 130 on ring 184. Thus, in FIG. 12, hosts A, B, C, D, and E are assigned multiple positions on ring 184. This multiple positioning tends to reduce the variance in the number of data sets assigned to each host 130, because the increased number of random placements on ring 184 tends to cause the number of data sets assigned to each host 130 to converge on an average value. Thus, assigning more positions to each host 130 on the ring 184 improves load balancing. In an embodiment, only the first instance of each encountered host 130 is placed in the preference list 190. In the case of key $k_1$, the first host with a larger position, which the corresponding data set is assigned to, is host A. With N=4, a process accessing a data set associated with key $k_1$ reads or writes to hosts A, B, C, and D. The preference list 190 for key $k_1$ is different than above due to the hosts having multiple positions on ring 184 and due to the hosts being encountered in a different order. In the case of key $k_2$, the first host with a larger position, which the corresponding data set is assigned to, is host B. A client process 134 accessing a data set associated with key $k_2$ reads or writes to hosts B, C, D, and A, in that order. In other example embodiments, multiple instances of each encountered host 130 may be placed in the preference list 190, e.g., in order to retry a host 130 that was previously unavailable.

Assigning hosts 130 multiple positions on ring 184 also facilitates usage of heterogeneous hardware, that is, more powerful hosts 130 may be assigned more positions on ring 184 and less powerful hosts 130 may be assigned fewer positions on ring 184. For example, in FIG. 12 host E has fewer positions than any other host, and thus is assumed to be a less powerful host. As will be appreciated, a range of hosts may be used, each being more or less powerful than other hosts 130. The number of positions assigned to a particular host 130 may be a function of the relative power of the particular host 130.

Additionally, if a sufficient number of positions assigned to each host 130, then each host 130 may have a successor/predecessor relationship with each of the other hosts 130. Accordingly, if one of the hosts 130 becomes unavailable, or is decommissioned, the load handled by the decommissioned host 130 may be approximately evenly dispersed across the remaining available hosts 130 without losing data availability. Likewise, when a host 130 becomes available again, or a new host 130 is added to data set service 112, the newly available host 130 may offload a roughly equivalent amount of load from each of the other available hosts 130.

B. Read/Write Access Operations

Referring now to FIGS. 13A-13B, 14A-14B, and 15A-15B, read and write operations are shown. The read/write operations may be invoked by a service request made to data set service 112 by client processes 134. Upon receiving the service request, the data set service 112 performs the requested operation and provides a response to the client process 134.

At data set service 112, one of the hosts 130 is responsible for coordinating the read or write request. The host 130 responsible for coordinating the read or write request is referred to herein as the coordinator. In an embodiment, the coordinator is the first host 130 listed in the preference list 190, and coordinating the read or write request includes performing a local read or write operation. For example, the service request may initially be received by another host 130, and that host 130 may make a decision to forward the service request to the host 130 which serves as the coordinator (e.g., the top host in the preference list 190). In another embodiment, the coordinator may be another host 130, such as a host 130 that is not on the preference list 190, and coordinating the read or write request does not include performing a local read or write operation. For example, the coordinator may be a host 130 which happens to initially receive the read or write request, but which does not happen to be near the top of the preference list 190, and which does not make a decision to forward the service request to a host which is near the top of the preference list 190. For purposes of providing an example, it is assumed herein that the coordinator is the first host 130 listed in the preference list 190.

In an embodiment, as described above, read and write operations may access the first N healthy hosts in preference list 190, skipping over hosts 130 that are potentially down or inaccessible. When all hosts 130 are healthy, the top N hosts 130 in the preference list 190 of a key may be accessed. When there are host failures or network partitions, hosts 130 that are further down in the preference list 190 may be accessed instead, thereby maintaining high availability.

Figure 13A:
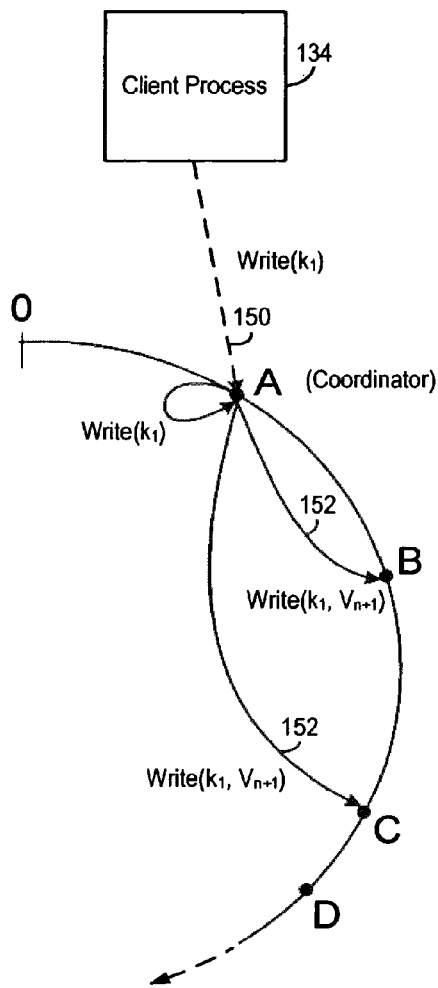
FIGS. 13A-13B are flowcharts of a write operation implemented by the system of FIG. 1 according to an embodiment.
Figure 13B:
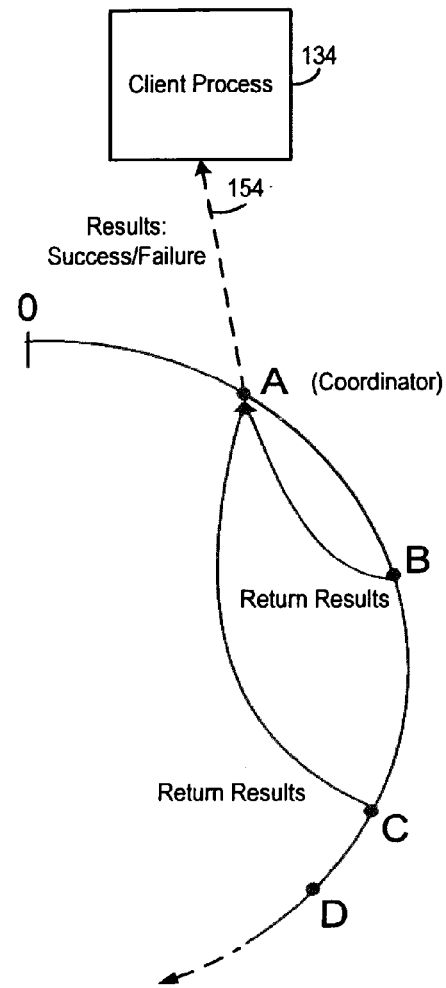

Referring first to FIGS. 13A-13B, an example write operation is shown. In FIG. 13A, a write request for version $V_{n+1}$ is received by host A from client process 134 (either directly or indirectly, as described above). Assuming the distribution of hosts 130 on ring 184 as shown in FIG. 12, then the preference list 190 for key $k_1$ is $P_L=\{A, B, C, D, E\}$. Host A is the coordinator and, in this example, performs the write operation locally (step 150). Host A then copies the new version $V_{n+1}$ to the remaining N−1 highest-ranked reachable hosts, hosts B and C (e.g., if N=3), which then also perform the write operation and store additional copies (step 152).

When the data set is stored, in addition to the data itself, the key associated with the data and a vector clock are also stored. The key permits the data set to be identified later. The vector clock is used for data versioning to capture causality relations between different versions of the same data set and comprises a list of (host ID, counter) pairs associated with the versions of data sets. Data versioning through the use of vector clocks is discussed in greater detail below in connection with FIG. 16.

In FIG. 13B, hosts B and C report back to host A whether the write operation was successful, and host A responds to client process 134 confirming whether the write operation was successful (step 154). In embodiment, in order for a write operation to be considered successful, the write operation must be successful at W hosts, where W is a configurable value and W≤N. Thus, for example, if N=3 and W=2, a write operation is considered successful if it is successful at two hosts 130, even if the write operation was attempted at three hosts 130. It may be noted that, if the write operation is successful one or more of the hosts 130, copies of the data set may still eventually migrate to the top N hosts in the preference lists 190, as described in greater detail below. Thus, even if a write operation is not considered successful according to the test set forth above, eventual consistency of the data set at the top N hosts may still be achieved.

Figure 14A:
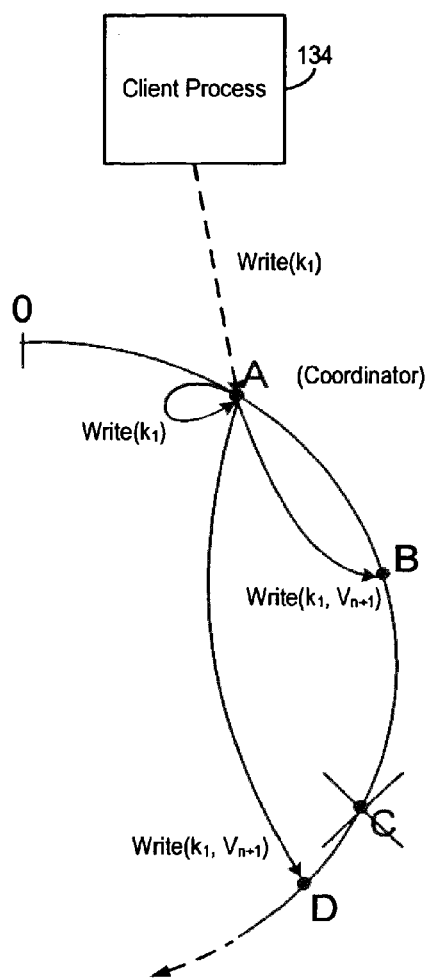
FIGS. 14A-14B are flowcharts of a write operation including a hand-off operation implemented by the system of FIG. 1 according to an embodiment.
Figure 14B:
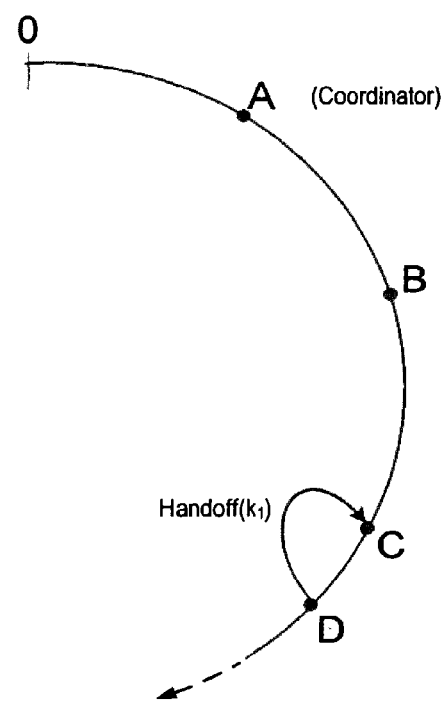

Referring to FIGS. 14A-14B, an example write operation with data hand-off is shown. Data hand-off is a mechanism that attempts to migrate data to the N highest-ranked hosts in the preference list 190 for a data set. For example, as described above, in general, the coordinator attempts to send the data to the top N hosts in the preference list 190. However, if one or more of the hosts 130 is down, the coordinator sends the data to hosts 130 further down the preference list 190. The preference list 190 provides a well defined sequence of hosts 130 that will participate in write operations (and in read operations), and the data hand-off mechanism is used to migrate the data back to the N highest-ranked hosts 130 in the preference list 190.

Thus, as shown in FIG. 14A, host A receives a write request for version $V_{n+1}$ as in FIG. 13A. Host A then performs the write operation and attempts to copy the new version to the remaining N highest-ranked reachable hosts, hosts B and C. In the illustrated example, host C has temporarily failed, and thus a write at host D is attempted. The data written at host D may be tagged with a hint suggesting which host 130 should have received and written the data (e.g., host C), so that at some later time host D may forward the data to host C. In FIG. 14B, when host C is healthy, a data hand-off is made and the data is copied back to host C. The data is thus migrated back to host C, which is one of the N highest-ranked hosts in the preference list 190.

In an embodiment, related techniques may be used to restore lost copies of data sets. For example, when hosts 130 enter or leave and there is a corresponding change in the preference lists 190 which may cause data to become misplaced. For example, a host 130 added to system 100 will displace the rankings of other hosts 130 in preference lists 190. In such situations, to implement a data hand-off, pairs of hosts 130 may periodically perform a comparison of ranges they share in common, and then perform necessary data transfers to reconcile any differences detected during the comparison. For example, a host (the sender) holding a range of keys for which it is not one of the top N hosts may choose any one of the top N hosts at random (the receiver). As another example, the host may choose a host in the top N hosts that is unlikely to have the data, for example, because the host recently joined the data set service 112. The two hosts 130 may then proceed with a low-level database comparison within that range, and the sender may forward any data sets that are more recent than what the receiver is storing to reconcile any differences that are detected by the comparison. The data may migrate to at least one host 130 in the preference list 190 and then be propagated to remaining hosts 130 in the preference list 190. For example, the propagation to the remaining hosts 130 may be implemented by comparing data sets stored at pairs of hosts 130 that are within the top N hosts in the preference lists 190 for some set of keys. In an embodiment, Merkle trees may be used to efficiently find set differences between the data stored at two hosts. For example, a Merkle tree may be used in which each node of the tree contains a summary (or hash value) computed over the data in its subtree, and in which the leaves contain hashes of one or more data values (e.g., keys, versions, and clocks). Differences in the contents of the trees may be found by recursing down branches along which the data summaries (hash values) differ. To improve the efficiency of the comparison, the Merkle tree may be encoded using a Bloom filter.

Using the above-described mechanisms, the data set service 112 makes an ongoing attempt to dynamically migrate copies of the most recent versions of data sets to the top N hosts in their preference lists 190. Thus, even though copies of the most recent version of a data set may initially be copied at hosts 130 which are lower in its preference list 190, or may for another reason become lost at one of the top N hosts, the copies eventually migrate back to the top N hosts in the preference lists 190, resulting in eventual consistency of the data set at the top N hosts.

Figure 15A:
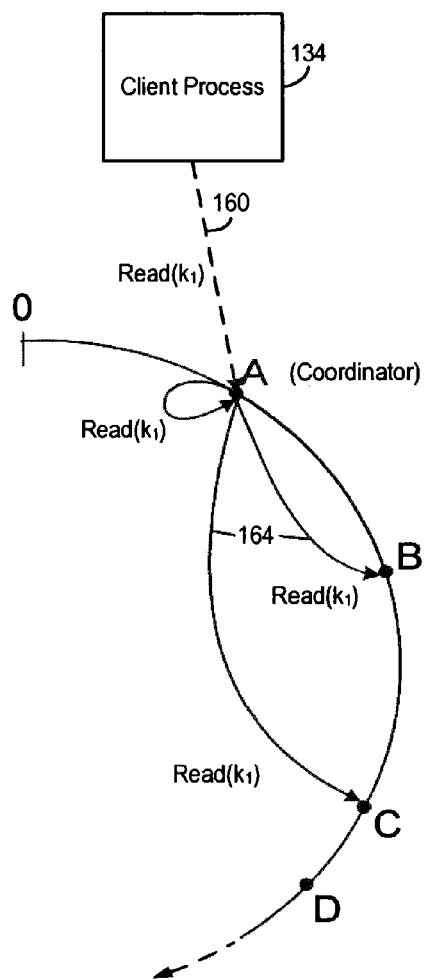
FIGS. 15A-15B are flowcharts of a read operation implemented by the system of FIG. 1 according to an embodiment.
Figure 15B:
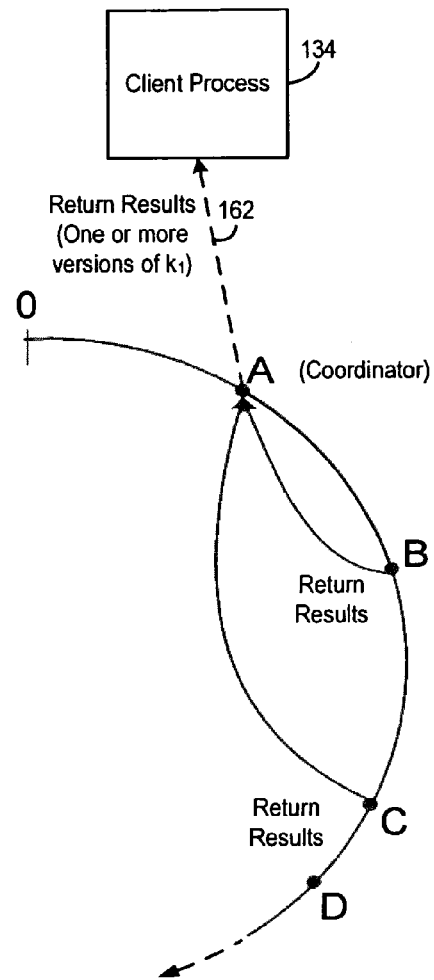

Referring to FIGS. 15A-15B, an example read operation 148 performed using preference list 190 is shown. In FIG. 15A, a read request is received by host A from client process 134 (either directly or indirectly, as described above) (step 160). Host A coordinates the read operation by requesting data from B and C in parallel to doing a local read. Hosts B and C perform the requested read operation. In FIG. 15B, host A receives read results from hosts B and C (step 162), and provides a response to client process 134 (step 164).

When receiving a read request, a coordinator may request all existing versions of data for that key from the N highest-ranked reachable hosts 130 in the preference list 190 for that key, and then wait for R responses before returning the result to the client process 134 (where R is the number of hosts that needed to participate in a successful read operation). In the example of FIGS. 15A-15B, the value R is set equal to three.

Like the value W, the value R is configurable. For example, if R=1, then once host A responds with a successful read, the data from that read is returned to the client process 134 for use. As another example, if R=2, then data may not be returned until reads are performed on both hosts A and B. Upon performing the two reads, system 100 realizes that the data is the same version and return the same data as when R=1. As yet another example, if R=3, then data may not be returned until reads were performed on hosts A, B, and C.

The values R and W may be configured to be less than N to provide consistent and high performance. Setting the values R and W such that R+W>N yields a quorum-like system in which there is a configurably high probability of overlap between the set of hosts 130 that participate in read and write operations. The higher N is set, the more likely the system is to have availability and durability because the chances that at least one replica exists is high. On the other hand, it may be noted that data need not be written to and read from the same set of hosts 130. For example, a data set may be written to hosts 130 which are further down on the preference list 190, migrated through data hand-off to hosts 130 that are higher on the preference list 190, and then ultimately read from the hosts 130 that are higher on the preference list 190. Eventual consistency of the data set at the top N hosts in the preference list 190 is achieved. In another embodiment, R and W may be configured to be much smaller than N (e.g., such that R+W<N), and copies of the data set may be sent only to W−1 hosts (in addition to the coordinator). In such an embodiment, the above-mentioned data repair mechanisms may be used to propagate the data set to remaining ones of the top N hosts.

In an embodiment, the application programming interface for the data set service 112 may be configured as follows. For example, the commands may have the following form:

write(Key, Value, Context)→ResultCode.
read(Key)→ValueList, Context, ResultCode where Key is an unbounded sequence of bytes, Value is an object comprising data (an unbounded sequence of bytes) and metadata (a read-only, arbitrary, extensible data set containing information about the value, including the last time the value was written, diagnostic and debugging information, and so on); ValueList is a list of values; Context is opaque object used internally by the storage system to track vector clock state for the read-modify-write cycle; and ResultCode is a code indication whether a read or write operation was successful.

The write operation changes the value identified by the key to the value specified by the Value parameter, unless the Context is stale, meaning that an intervening write has already occurred on that key. In an embodiment, the client process 134 restarts the read-modify-write cycle (optimistic locking). In another embodiment, the client process 134 may permit the write operation to continue, in which case there may be conflicting versions of the data set. The read operation performs a lookup in the data set service 112 for value(s) associated with the key. Any and all values that are successfully read are returned in the ValueList. An opaque Context object is returned for use in a subsequent update operation. If multiple values are returned, the client process 134 is expected to perform a reconciliation operation for all of the values. If a subsequent update is performed (using the returned Context), the assumption is that the updated value is a represents a reconciliation of all values returned in the value list, plus any additional changes to the value (if any).

As will be appreciated, a greater or lesser level of complexity in the application programming interface may be used. For example, in an embodiment, the Value object may include a type parameter that permits information concerning how long data should be maintained to be specified, e.g., so that old/abandoned data may eventually be deleted.

In another embodiment, a key may be used that is divided into two parts: (partition-key, object-key). In such an embodiment, the partition-key may be hashed to generate the preference list 190 for the key, as described above for the key parameter. Two data sets sharing the same partition-key may therefore have the same preference list 190, and hence with very high probability their respective copies of data sets would reside on the same set of hosts 130. Such a scheme allows accessing several data-sets together as an optimization, since the same set of hosts is in the top N hosts of the preference 190 lists for all the keys that share a partition-key. For example, in the merchant website example of FIG. 2, it may be desirable to store all data sets that relate to a particular user (e.g., shopping cart, profile, credit-card information, and so on) on the same set of hosts 130. By using the same partition-key for each of these data sets, the data sets are stored on the same set of hosts 130. The (partition-key, object-key) combination uniquely identifies each individual data set for the user. Another optimization made possible by this arrangement is range queries on keys sharing a partition-key. For example, such range queries may be used to iterate through all object-keys for a given partition-key, by accessing a single host 130 that is in the top N of the preference list 190 for that partition-key.

In another embodiment, a type parameter may be added to the write command (e.g., write(Key, Value, Context, Type)→ResultCode), so that a client process 134 may specify the type of data that is being written. The data set service 12 may be configured to delete data a certain amount of time after it is last accessed (e.g., in order to reclaim storage space when data is no longer needed). The time allowed before deletion may be based on the type of data. The type may also be used to decide the number of copies of the data that the data set service 112 should store (e.g., on the basis that some types of data may be more critical than others).

In another embodiment, a read context may also be passed as input to the read command (e.g., read(Key, Context)→ValueList, Context, ResultCode). In such an embodiment, the read context passed as input to the read command may be obtained as a result of a previous read. By passing it back as input to a read operation, a client process 134 may indicate interest in retrieving the specific version of the data set that was accessed during the previous read operation. As will be appreciated, other variations on the application programming interface are also possible.

III. Data Versioning

A. Operation of Vector Clocks

Figure 16:
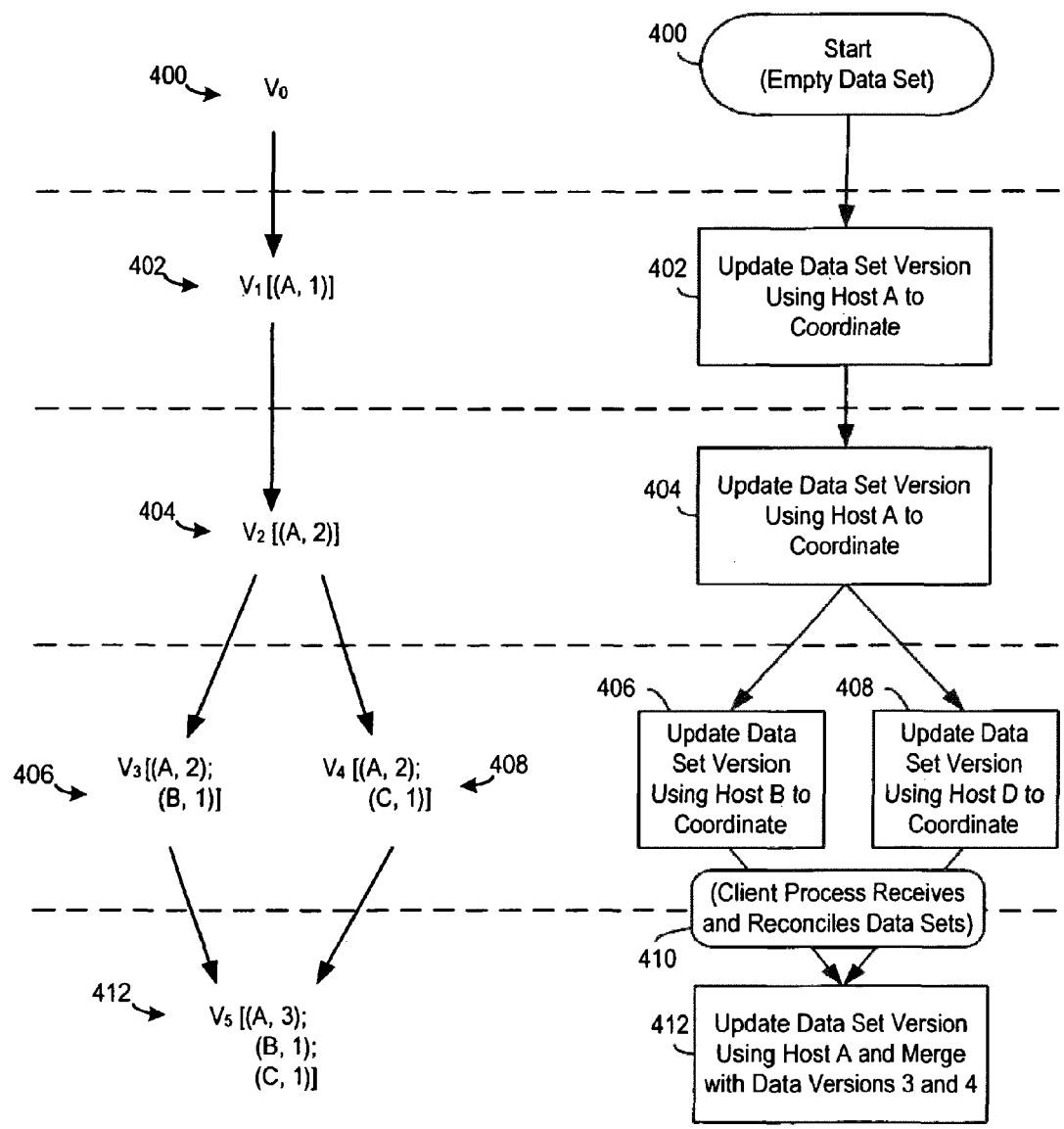
FIG. 16 is a flowchart of a data versioning arrangement used in the system of FIG. 1 according to an embodiment.

Referring to FIG. 16, a data versioning arrangement is discussed. As previously indicated, in order to provide high availability, the data set service 112 permits multiple versions of the same data to be present at the same time on different hosts 130. An ongoing attempt is made to migrate copies of the most recent versions of data sets to the top N hosts in their preference lists 190, however, this process is not instantaneous. Before the migration occurs, copies of older versions of a data set may be in existence at various hosts in its preference list 190, even at hosts 130 that are at or near the top of the preference list 190. Thus, for example, one host 130 may have one version reflecting temporarily lost old changes and another host 130 may have another version reflecting new changes made while the old changes are unavailable.

In an embodiment, it is desirable to be able to determine whether two copies of the same data set are different versions of the data set and have differences relative to each other. It is also desirable to be able to assess those differences, such that it is possible to distinguish situations in which two versions have an ancestor-descendant relationship with each other (e.g., one version is merely outdated and has been incorporated into the other version) from situations in which two versions are in conflict (e.g., each version contains data that is not reflected in the other version).

In an embodiment, a version history is stored with each copy of a data set. For example, the version history may be stored in the form of vector clocks which capture causality relations between different versions of the same data set. The vector clocks may concisely store enough information about the version history of the data set to permit a determination whether two versions are in conflict. In an embodiment, the vector clock comprises a list of {host ID, counter} pairs associated with the versions of data sets. The host ID value indicates the host that coordinated the write operation. The counter value indicates the number of times that host has written to the data set. The counter value encodes causality information for a data version, that is, a summary of what changes preceded that version.

When trying to determine whether two versions of a data set have a causal ordering (and hence one can be forgotten) or are on parallel branches (and hence need reconciliation), it is enough to examine their vector clocks. If one has greater-or-equal counter values for all the host-IDs in the other's vector clock, then the former is a descendant of the latter, and the latter can be forgotten. Thus, the vector clocks permit client processes 134 to reconcile multiple versions of the same data in order to collapse multiple branches of data evolution back into one.

FIG. 16 illustrates an example of data versioning as may be used by data set service 112. Initially, at step 400, the data set is empty. At step 402, a client process 134 updates empty data version $V_0$ using host A. Host A, which coordinates the write, copies the clock of the previous version and increases the counter value associated with host A and creates the vector clock for data version $V_1$. In this case, the counter is incremented to one since this is the first update. Data set service 112 stores data version $V_1$ and its associated vector clock [(A, 1)], e.g., host A performs a local write operation and further sends the new version (along with the new vector clock) to hosts B and C to perform additional local write operations and store additional copies. In one example embodiment where data set service 112 stores shopping cart information within a merchant website system, this update may have occurred due to a visitor adding an item to a shopping cart. As will be appreciated, what constitutes a new "version" of the data set may vary depending on the application.

In FIG. 16, the coordinator is one of the N highest ranked reachable hosts in the preference list 190. As indicated above, the coordinator may also be a host 130 that is not one of the N highest ranked reachable hosts in the preference list 190. In such an example, when receiving a write request, the coordinator may choose one of the N highest-ranked reachable hosts 130 in the preference list 190 for that key to generate a vector clock for the new version and store the new version locally. The coordinator may then send the new version (along with the new vector clock) to the remaining N highest-ranked reachable hosts, as previously described.

At step 404, the same client process 134 updates data version $V_1$ using host A. The host A, which coordinates the write, copies the clock of the previous version and increases the counter value associated with host A to two and creates the vector clock for data version $V_2$. Again, host A forwards the data version $V_2$ and its associated vector clock [(A, 2)] to hosts B and C for local write operations and store additional copies. Version $V_2$ descends from version $V_1$ and therefore over-writes version $V_1$, however there may be replicas of version $V_1$ lingering at host partitions that have not yet seen version $V_2$.

At step 406, the same process updates data version $V_2$ using a host B to coordinate the request. For example, host A may be unavailable. Since a new host B coordinates the update, a new vector clock entry is created associated with this host B with a counter value of one. Data set service 112 stores data version $V_3$ and the associated clock [(A, 2); (B, 1)]. The vector clock for data version $V_2$ may also be stored, if desired, in order to maintain version history or to allow more complex reconciliations to be performed. After step 406, a host that is aware of version $V_1$, but not of version $V_2$, may receive version $V_3$ and the associated vector clock. The host can determine by comparing the respective clocks [(A, 1)] and [(A, 2); (B, 1)] of version $V_1$ and version $V_3$ that version $V_1$ causally precedes version $V_3$ and hence that it was meant to be overwritten by version $V_3$. If, on the other hand, a different sequence of events has occurred, and a vector clock for data version $V_3$ has less-than-or-equal counters for all of the hosts in the clock of version $V_1$, then version $V_3$ is an ancestor of version $V_1$ and can be removed.

At step 408, a different client process 134 reads version $V_2$ and tries to update it using host C. For example, hosts A and B may be unavailable. In the present example, it is assumed that host C was not involved in the write operation of step 406, and is not aware of version $V_3$. Since a new host C coordinates the update, a new vector clock entry is created associated with this host C with a counter value of one. Data set service 112 stores data version $V_4$ and the associated clock [(A, 2); (C, 1)]. After step 408, a host that is aware of version $V_1$ or version $V_2$ could determine, upon receiving version $V_4$ and the associated vector clock, that version $V_1$ and version $V_2$ are over-written by the new data and can be removed.

At step 410, a client process 134 reads both version $V_3$ and version $V_4$. For example, the read operation may be coordinated by host A and may also involve hosts B and C. Host A obtains its own copy of the data set with vector clock [(A, 2)], the copy of the data set from host B with vector clock [(A, 2); (B, 1)], and the copy of the data set from host C with vector clock [(A, 2); (C, 1)]. The context of the read is a summary of the clocks of version $V_3$ and version $V_4$, namely [(A, 2); (B, 1); (C, 1)]. Host A will find that there is no causal relation between version $V_3$ and version $V_4$ because, from an examination of the vector clocks, there are changes in each of version $V_3$ and version $V_4$ that are not reflected in the other. The versions $V_3$ and $V_4$ are then reconciled.

In an embodiment, the data set service 112 (host A, in this example) provides the multiple versions to client process 134 (and/or version reconciliation logic 136 associated with client process 134), which in turn decides how to perform the reconciliation. This arrangement permits any business logic that is used to perform the reconciliation to be stored or associated with the client process 134 rather than with the data set service 112. Although client process 134 and version reconciliation logic 136 are shown as being separate, it will be appreciated that client process 134 and version reconciliation logic 136 may be provided in integral fashion. In another embodiment, the version reconciliation logic 136 may be provided with the data set service 112. The multiple versions may be reconciled by, for example, using a default ordering on the versions to decide which one to keep, by merging the different versions to produce a single reconciled version, by performing an analysis of the data and determining how to treat discrepancies on a discrepancy-by-discrepancy basis, and so on. As will appreciated different approaches may be more optimal in different situations, depending on the application.

At step 412, a write request is received from client process 134. Host A coordinates the write and updates the corresponding counter value in the vector clock. The updated version may also include other changes implemented by client process 134, unrelated to the reconciliation operation. New version $V_5$ will have the vector clock [(A, 3); (B, 1); (C, 1)].

It may be noted that, at step 412, host A updates the counter number to [(A, 3); (B, 1); (C, 1))], regardless whether any changes are implemented to the data set in addition to the reconciliation. No single version exists with the vector clock [(A, 2); (B, 1); (C, 1)], so updating the counter in the vector clock distinguishes the parent clock from the new clock. Additionally, increasing the counter is desirable because multiple client processes may attempt to reconcile at the same time (e.g., using different hosts to coordinate) but arrive at different results (e.g., because of different merge logic, because they added changes as well as reconciling, and so on). If the counter is not updated, the different merge attempts may be assigned the same clock, i.e., [(A, 2); (B, 1); (C, 1)], and hence be indistinguishable from each other.

B. Vector Clock Information and Truncation

In an embodiment, rather than comprising only (host ID, counter) pairs, the vector clock comprises a number of additional values and has the following form:

Vector Clock={(<Host ID> <host-gen> <key-gen>), <counter>, <time-stamp>}

The host ID is a unique identifier for a host and the counter parameter encodes the causality information for a data version, and corresponding to the {host ID, counter} pair described previously. In an embodiment, the combination of the (<Host ID> <host-gen> <key-gen>) parameters operates in the manner described previously with regard to the host ID alone. That is, a host is considered a different host (i.e., no causal relation between different versions of a data set may be implied) if any one of the three parameters (<Host ID> <host-gen> <key-gen>) is different.

In an embodiment, hosts 130 do not write vector clocks synchronously to disk. Hence, the potential exists that a host may forget the sequence numbers it generated for each key and consequently reuse the sequence numbers, thereby compromising the consistency of the vector clocks. When the risk of forgetting (e.g., after host failure) is identified, a host 130 updates its <host-gen> parameter so that for all future vector clocks it generates (for any key), it appears to be an entirely different host. Thus, incrementing the <host-gen> parameter upon rebooting the host 130 permits vector clocks generated prior to failure to be distinguished from vector clocks generated after rebooting. As will be appreciated, the counter for each vector clock is monotonically increasing in an unbounded fashion. In an embodiment, in order to avoid unbounded counter numbers, each host is periodically forced to choose a new unique identity, e.g., by incrementing the <host-gen> parameter. For example, a host be assigned a new unique identity after rebooting, thereby also zeroing the <counter> parameter. This causes the highest possible counter value to be bounded by the number of writes that a single host 130 can coordinate before changing identity. In another embodiment, an identity change may be triggered automatically in a host if one or more of its counter values reaches a predetermined threshold value.

The <key-gen> parameter may be used to track a key generation counter. In an embodiment, after data hand-off, hosts 130 delete any data that was obtained. This saves storage capacity for hosts 130 that are lower down on the preference list 190. At the same time, the hosts 130 maintain the <key-gen> parameter, which is incremented after data hand-off, thereby preventing any causal relationship being assumed the next time the host 130 is asked to perform a write operation. For example, if host D coordinates a write operation for version of a data set having a vector clock [(A, 3), (D, 1)], performs a data hand-off, and later is asked to coordinate another write operation for a version of the data set having a vector clock [(A, 2)], it would be inappropriate for the updated data set to have a vector clock [(A, 3), (D, 2)]. By assigning a new <key-gen> value in this situation, the host 130 is made to appear like a new host, thereby avoiding the appearance of causality between the two versions. In an embodiment, each host 130 maintains a separate <key-gen> per key and remembers the key generation for every key for which it generated a vector clock since it last changed identity (e.g., changed <Host ID> or updated its <host-gen>). Likewise, each host 130 may also remember the last <counter> parameter used in a vector clock for the key since either the corresponding <key-gen> parameter or <host-gen> parameter was updated.

The <time-stamp> parameter may be used to monitor the age of the data set and entries in its vector clock. In some applications, it is desirable to delete data if the data exceeds a predetermined age. For example, in a shopping cart application, it may be desirable to delete a shopping cart that has gone abandoned for a period of days, weeks, months or years, and so on. The time-stamp may be used to support the deletion of data sets in this manner. Additionally, the time-stamp may also be used for vector clock truncation. As will be appreciated, as the length of the list of different hosts (or same hosts with different <host-gen> or <key-gen> parameters) that have coordinated a write operation in connection with a data set increases, the length of the vector clock for that data set increases (i.e., because the length of the list of (host ID, counter) pairs contained in the vector clock increases). Accordingly, using the time-stamp, vector clocks that have aged by a predetermined amount may be deleted or truncated.

In other embodiments, rather than using vector clocks, other version history mechanisms may be used to track the changes in data sets. For example, hash histories may also be used. Herein, the term "version history" refers to any data structure that may be used to track changes in a data set over time (i.e., to track that changes exist, not necessarily to track the nature of the changes). As may be appreciated, different version history mechanisms may provide different tradeoffs in terms of disk space usage, bandwidth, maintaining consistency when deleting old versions, speed and ease in detecting causal precedence, and so on. In an embodiment, a version history mechanism is used which permits the detection of causal precedence (or the absence thereof, previously referred to as a conflict) between two or more copies of a data set. The version history mechanism may be used to allow version conflicts to occur (availability) without the loss of data and to facilitate maintaining consistency as data migrates to hosts that are highest in preference lists.

IV. Multiple Data Centers

A. Architecture of Multiple Data Center Arrangement

Referring to FIGS. 17-25, another embodiment of data processing system 100 is shown. In FIGS. 17-25, data sets are partitioned over hosts 130 in accordance with a multi-tiered ring arrangement. The multi-tiered ring arrangement may, for example, be used to implement data set storage systems in which hosts are located in different geographic locations (e.g., in different data centers, which may be in different cities, in different countries, on different continents, etc.). For example, the data may be replicated across such different data centers in order to reduce the probability of correlated failures between hosts. The failure of a single data center is unlikely to significantly impact availability of the entire system. Additionally, by redirecting client requests to a closer data center (in terms of network latency), the end-to-end data retrieval response time may be reduced. The multi-tiered ring arrangement may also be used for other reasons, for example, such as with hosts located within a common data center. For example, different tiers of rings may be used to specify areas within a data center, particular racks of hosts within a data center, and so on. For purposes of providing an example, in FIG. 17, it is assumed that the multi-tiered ring arrangement is used to implement a data storage set storage system in which hosts are located in different data centers.

Figure 17:
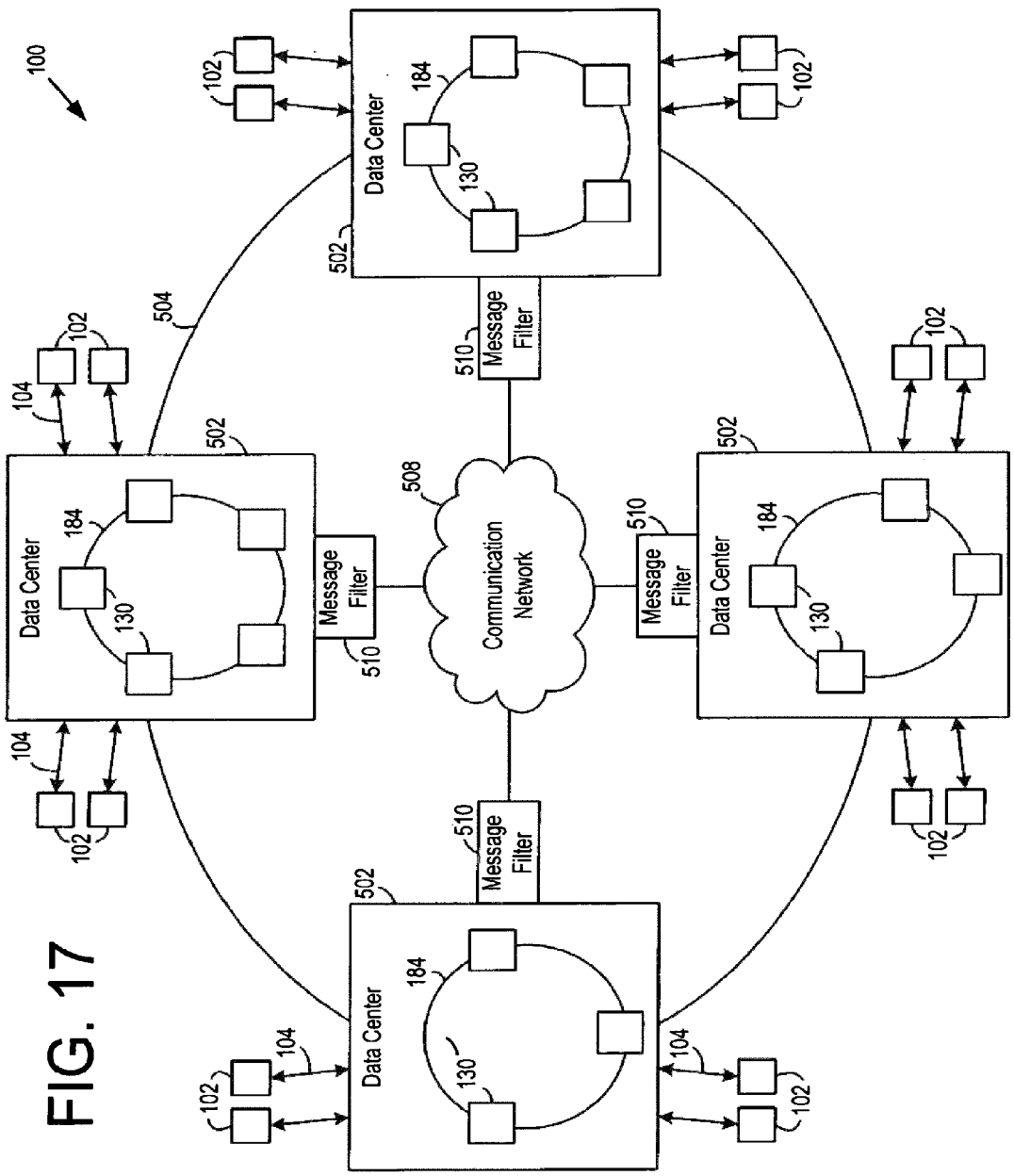
FIG. 17 is a block diagram showing a data set service of FIG. 1 in greater detail according to an embodiment.

Referring first to FIG. 17, FIG. 17 shows an embodiment in which data processing system 100 comprises a two-tiered or two-level ring arrangement. The two-tiered ring arrangement may be used to implement the data set service 112 shown in FIG. 1 and/or FIG. 2. In FIG. 17, data processing system 100 comprises a plurality of data centers 502 logically positioned on an upper level ring 504. Although four data centers 502 are shown, it will be appreciated that in practice any number of data centers 502 may be used.

The data centers 502 may be connected to each other by way of a communication network 508 (e.g., a wide area network, the Internet, etc.). Messaging between the data centers 502 may pass through message filters 510, discussed in greater detail below in connection with FIG. 25. As in FIGS. 1-2, each of data centers 502 may be accessed by various user computers 102 by way of communication network 104 (e.g., the Internet).

Each of the data centers 502 further comprises a plurality of hosts 130 logically positioned on a respective lower level ring 184. In the illustrated example, each lower level ring 184 corresponds to a different data center 502. Within each data center 502, the hosts 130 on each ring 184 may also operate as described above in connection with FIGS. 3-16. The lower level rings 184 may be homogenous or heterogeneous (e.g., having different numbers of hosts, different hash functions, different configurations, and so on). Further, as will be seen below, the operation of the upper level ring 504 with regard to data centers 502 may be the same as the operation of ring 184 as described above in connection with FIGS. 3-16 with regard to hosts 130.

Referring to FIG. 18, in an embodiment, the data set storage system 118 may be distributed across the data centers 502, such that each data center 502 stores a portion of the data sets. Each of the data centers 502 may have responsibility for a range of hash values on the top level ring 504 (or sets of ranges of hash values on the top level ring 504, as described in greater detail below), with each data center 502 being responsible for read/write operations in connection with hash values extending from its own position in the hash range to the position of the previous data center 502, in the same manner as described above in connection with hosts 130 and ring 184. When a request to access a data set is received (e.g., via a read operation or a write operation), the key is applied to a hash function for the upper level ring 504 to determine the data center(s) 502 from which the data set may be accessed. (In FIG. 18, the designations DC1-DC4 respectively denote different ones the four data centers 502 in FIG. 17.) The key is also applied to a hash function for the lower level ring 184 to determine the hosts 130 within the relevant the data center(s) 502 from which the data may be accessed. The hash function that is used for upper level ring 504 may be the same or different as the hash function (or hash functions) used for lower level rings 184. Likewise, as indicated above, the hash function that is used for each of the lower level rings 184 may be the same or different as the hash function (or hash functions) used for other lower level rings 184. With the mapping arrangement shown in FIG. 18, individual data centers 504 may be added or removed without a total remapping of the partitioning of data sets to data centers 504, thereby promoting scalability.

In an embodiment, data replication across data centers may also be supported in the same manner as described above in FIG. 10 in connection with hosts 130. Thus, as shown in FIG. 18, rather than the data set being assigned merely to the immediate data center 502 on the ring 504, the data set may be assigned to the first M successor data centers 502. Data set storage service 112 may operate to ensure that the data set is replicated at M data centers 502, and each data center 502 may responsible for the region of the ring 504 between itself and its Mth predecessor.

The number of data centers 502 that store replicas of a given data set may be configurable, for example, on a per data set basis, per data type basis, and so on. As will be appreciated, the number of replicas of each data set that are maintained may be determined based on, among other things, a desired level of availability and a desired level of update traffic on communication network 508. That is, availability increases as more replicas are stored across different data centers. However, the amount of network traffic on communication network 508 also increases during updating as the replicated copies of the data set are kept consistent. Assuming a data set is to be replicated within a data center 502, the number of hosts within the data center 502 that replicate the data set may also be configurable, for example, on a data center-by-data center basis, on a per data set basis, on a per data type basis, and so on.

In an embodiment, load balancing across data centers may also be supported in the same manner as described above in FIG. 12 in connection with hosts 130. For example, the data centers 502 may be assigned to multiple positions on the ring 504. Such an arrangement may be used to avoid non-uniform data and load distribution that may otherwise be created by a random position assignment of each data center 502 on ring 504. Such multiple positioning tends to reduce the variance in the number of data sets assigned to each data center 502, because the increased number of random placements on ring 184 tends to cause the number of data sets assigned to each data center 502 to converge on an average value. Additionally, assigning data centers 502 multiple positions on ring 504 also facilitates usage of heterogeneous data centers, that is, more powerful data centers 502 (e.g., as determined based on processing capacity, storage capacity, and/or network capacity) may be assigned more positions on ring 504 and less powerful data centers 502 may be assigned fewer positions on ring 504. Additionally, assigning data centers 502 multiple positions on ring 504 also facilitates transferring load between data centers, because each data center 502 may have a successor/predecessor relationship with each of the other data centers 502 (assuming a sufficient number of positions is assigned to each data center 502 on the ring 504). Thus, for example, if one of the data centers 502 becomes unavailable, or is decommissioned, the load handled by the decommissioned data center 502 may be approximately evenly dispersed across the remaining available data centers 502 without losing data availability.

Referring to FIG. 19, each data set may have a preference list 519 of data centers 502, which is the order that each of the data centers 502 is first encountered while moving clockwise around the ring 504 from the hash value generated based on the key. The preference list 519 represents the preferred order of data centers 502 used for accessing (e.g., reading, writing, and so on) a data set. When all the data centers 502 are available, the top M data centers 502 in the preference list 519 store the data set. Successive operations on the same data set may access the same set of M data centers, and may therefore be consistent (i.e. an operation accesses the same data that was read/written by the previous operation on the same key). If one or more data centers 502 in the preference list 519 happen to fail, or if there is a network partition, the data set may temporarily be stored at a data center 502 or data centers 502 lower ranked in the preference list 519, thereby maintaining high availability. Additionally, although successive operations to the same data set may access different sets of data centers 502, the operations may still be consistent as long as there is some overlap in the sets of data centers 502 that are accessed. By accessing available data centers 502 that are highest in the preference list 519, minor changes in the availability of hosts from operation to operation do not negatively affect consistency because subsequent accesses may involve overlapping data centers.

The preference list 519 may, for example, be computed based on the hash function. In an embodiment, in order to access the data centers 502 that store a given data set, each host 130 may store information regarding the data center positions in the hash space (in order to compute the preference list 519) as well as the availability of data centers 502 (in order to select the M available data centers that are highest in the preference list 519). In another embodiment, the preference list 519 may be stored, e.g., to permit the stored preference list 519 to be constructed based on the hash function and based on other factors may be desired to be taken into account when constructing the preference list 519.

B. Access Operations

Figure 20:
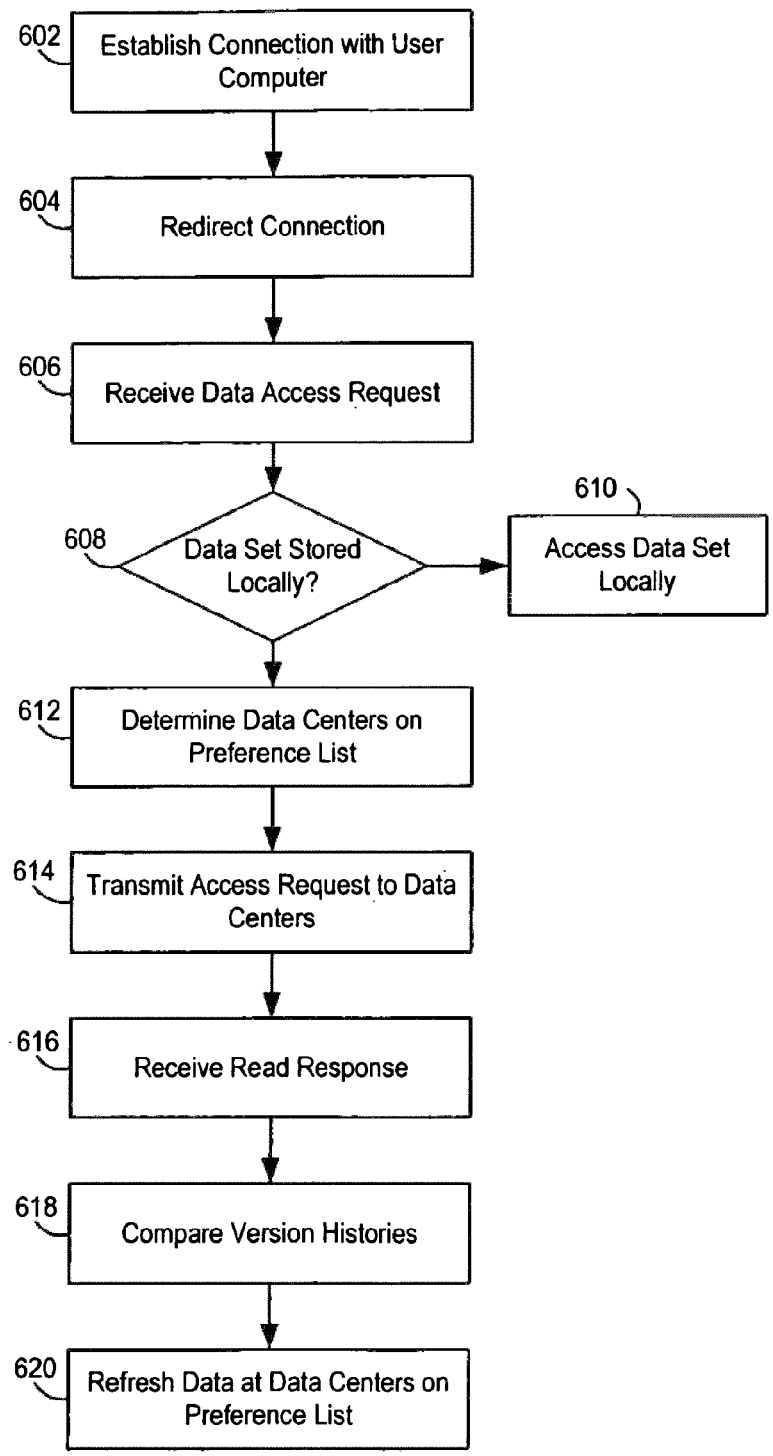
FIG. 20 is a flowchart of an access operation implemented by the system of FIG. 17 according to an embodiment.
Figure 21:
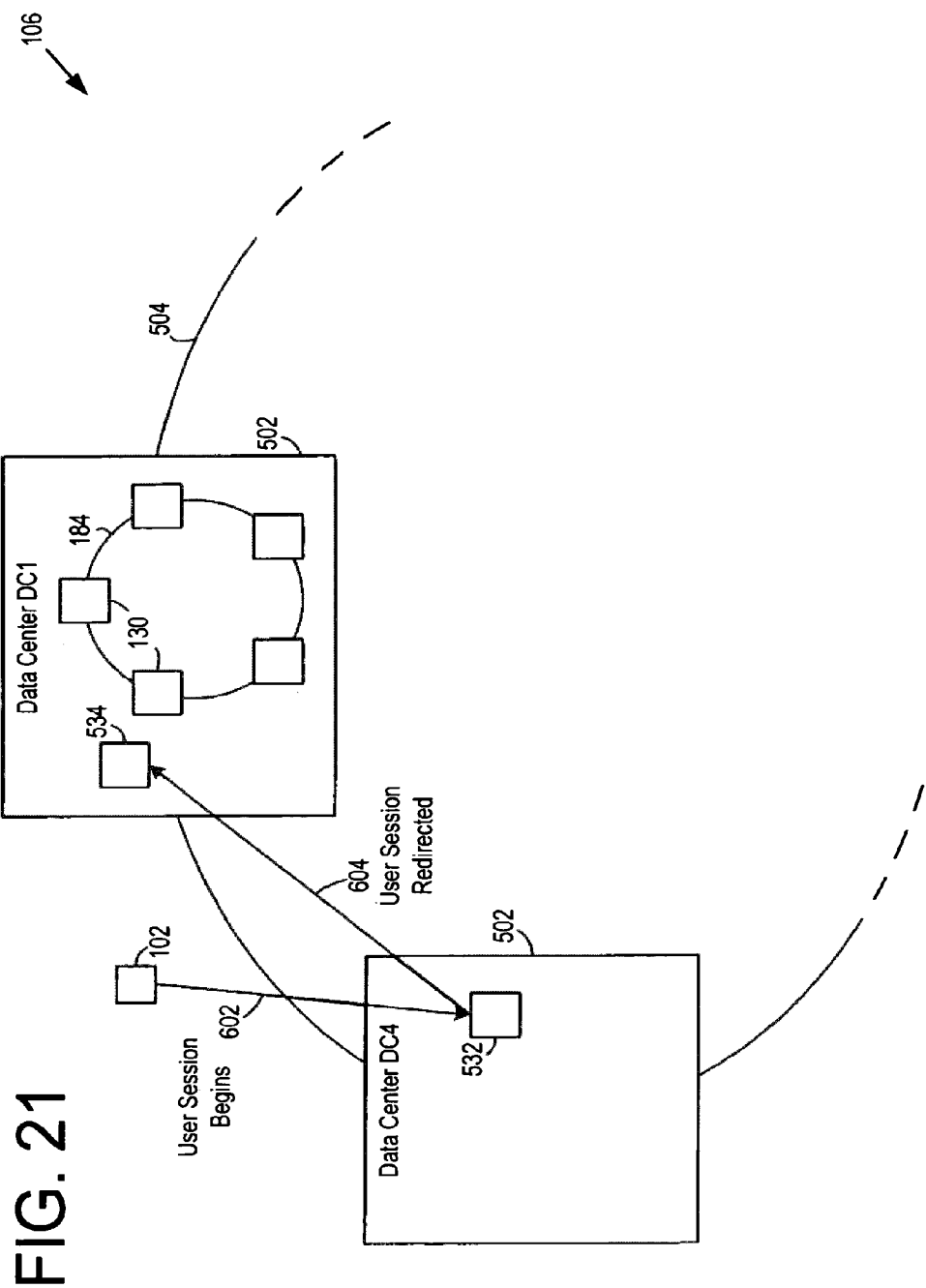
FIGS. 21-24 are diagrams showing aspects of the access operation of FIG. 20 in greater detail according to an embodiment.

Referring now to FIGS. 20-24, operations in connection with accessing data sets stored in the data centers 502 are shown. FIG. 20 is a flowchart of an access operation implemented by the system of FIG. 17 according to an embodiment. FIGS. 21-24 are diagrams showing aspects of the access operation of FIG. 20 in greater detail according to an embodiment.

At step 602, a connection is established by a data center 502 with a user computer 102. As will be appreciated, each data center 502 may include not only hosts 130 that implement data set service 112 but also other hosts that implement network interface 110 and other services 114. Accordingly, with reference to FIG. 21, the connection may be established with a host 532 which may, for example, be one of the hosts that implements network interface 110.

In an embodiment, the connection with the user computer 102 may be established at one data center 502 (e.g., potentially on a random basis), and then redirected to another data center 502. For example, in FIG. 21, a connection with user computer 102 may be established by a host 532 in one data center DC4 (step 602), and then transferred to another host 534 in another data center DC1 (step 604) which, for example, may be closer, may be less loaded, and/or may exhibit other characteristics which make it better suited for maintaining the connection.

Figure 22:
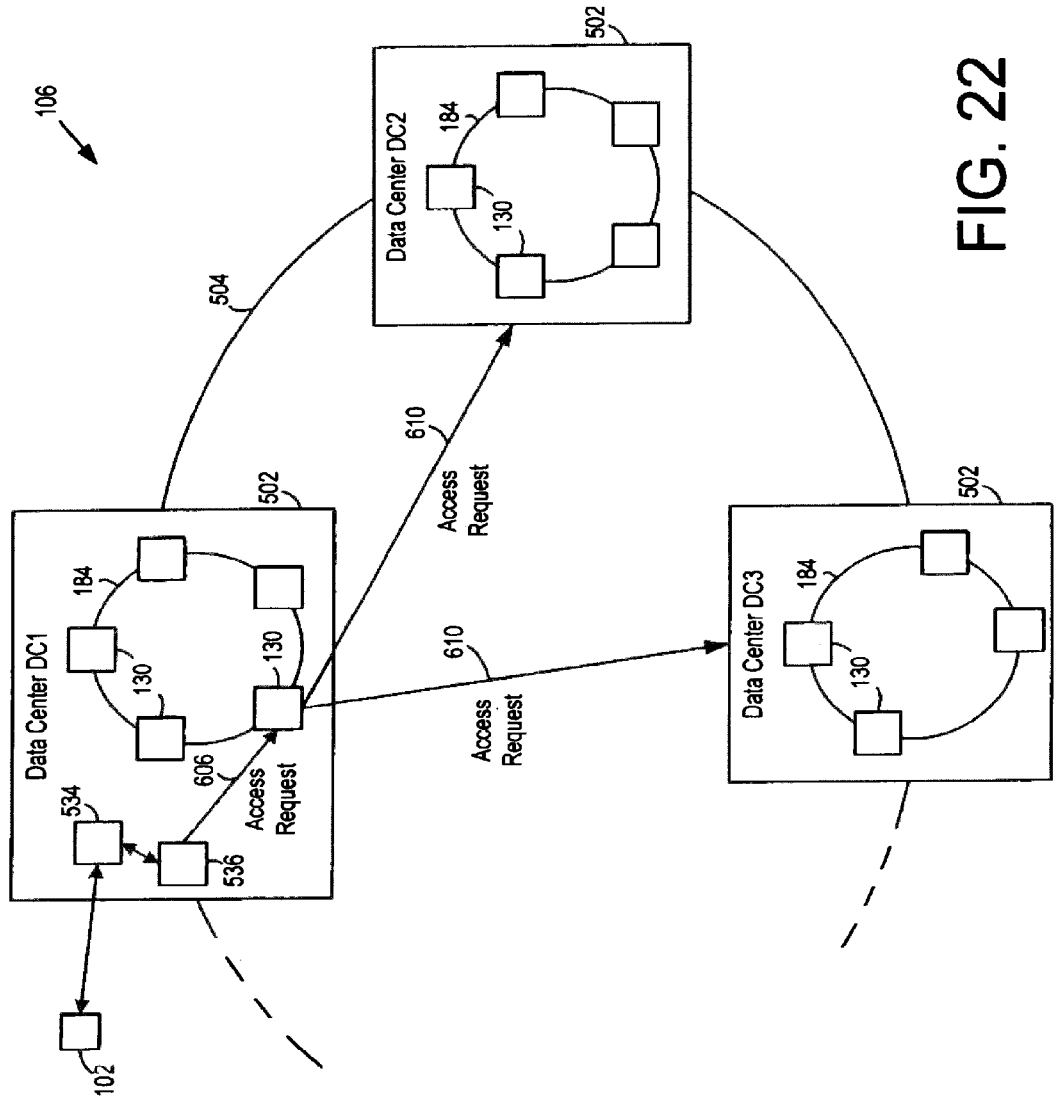
Figure 23:
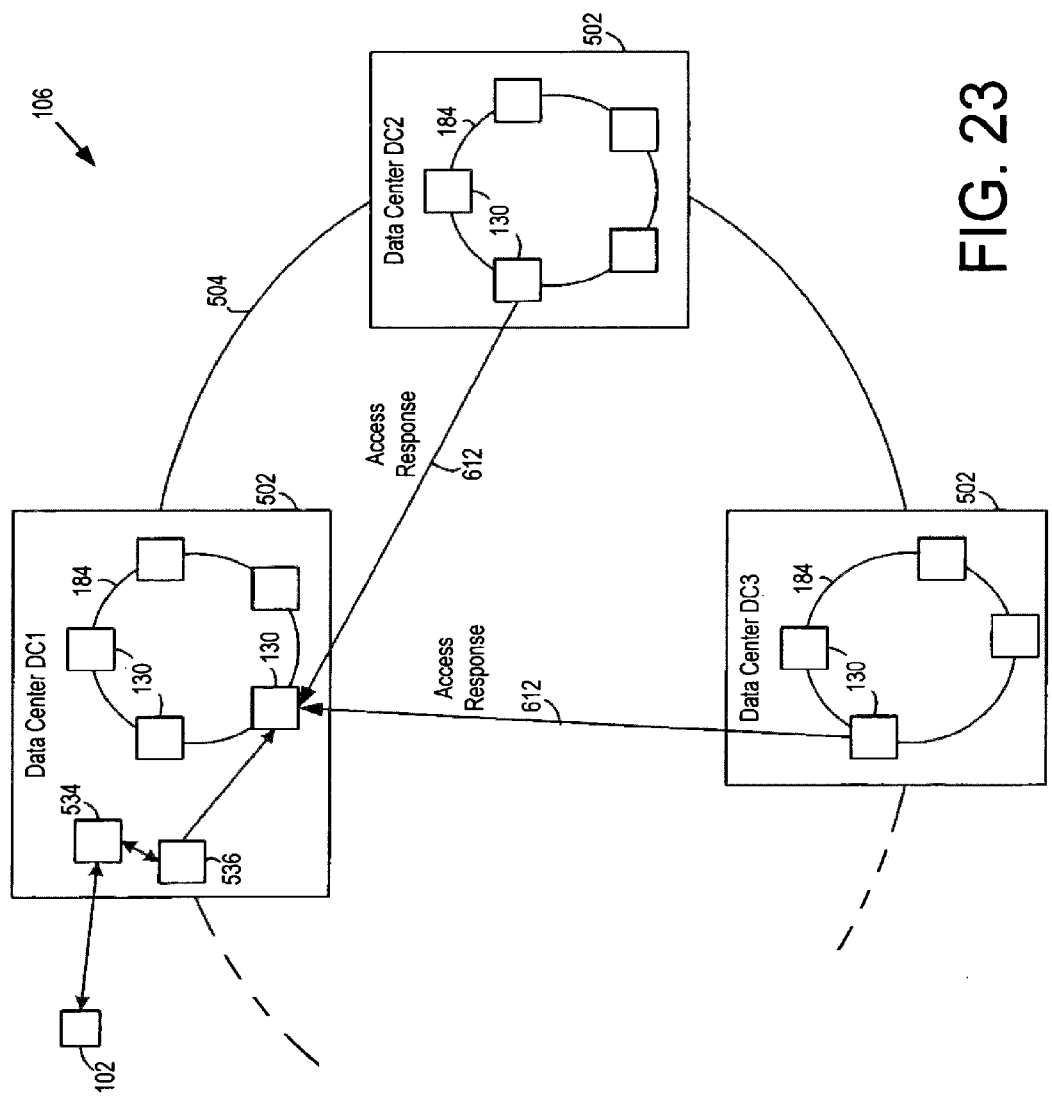

At step 606, a data access request (e.g., a read request, a write request, etc.) is received. With reference to FIG. 22, the data access request may be received by a host 130 in data set service 112 from host 536, which may be executing a client process 134 (see FIG. 3). For example, in the context of the example provided above in FIG. 2, host 534 may be one of the hosts that implements network interface 110 and may be connected to user computer 102, host 536 may be one of the hosts that implements shopping cart service 124 and may receive requests from host 534, and host 130 may be one of the hosts that implements data set service 112 and may receive access requests from host 536. When an access request for a data set is received at a host 130 in a data center 502, the host 130 determines whether the data set is stored locally in the data center 502 at step 608. The data set may be stored locally in the data center 502, for example, because the data center 502 is one of the top M data centers in the preference list 519, because the data center 502 is further down on the preference list 519 but is temporarily storing the data set until the data set migrates to a data center 502 that is one of the top M data centers in the preference list 519, because the data center 502 has established a connection with a user and has temporarily stored a leased copy of the data set (as described in greater below), or for another reason. If the data set is stored locally, then a response may be provided based on the local copy or copies (possibly more than one version) of the data set at step 610. Otherwise, the host 130 may obtain a copy or copies (possibly more than one version) of the data set from other ones of the data centers 502. If there are conflicting version of the data set (e.g., conflicting versions from within a data center, conflict versions from different data centers, or both), any such conflicting versions may be reported to the data set version reconciliation logic 136 associated with the particular client process 134 requesting the data set and resolved by the data set version reconciliation logic 136, as described above. For purposes of providing an example, it is assumed that data center DC1 is not one of the M data centers that stores a replica of the data set. Therefore, host 130 at data center DC1 operates as a coordinator to obtain copies of the data set from other data centers.

At step 612, after the access request is received, the key for the data set is applied to a hash function for the upper level ring 504 and the lower level ring 184. At step 614, with reference to FIG. 22, host 130 at data center DC1 (operating as the coordinator) requests the data from one or more of the top data centers in the preference list 519. In an embodiment, host 130 applies the key to a hash function for the upper level ring 504 and transmits an access request to data centers DC2 and DC3 (e.g., after determining that data centers DC2 and DC3 are at the top of the preference list 519 for the data set). When the access request is received by respective hosts 130 at data centers DC2 and DC3, those hosts 130 apply the key to a hash function for the lower level ring 184 to determine the hosts 130 within the respective data center that store the data set. In this manner, it is not necessary for host 130 at data center DC1 to store information concerning the positions of hosts 130 on the rings 184 of the remote data centers DC2 and DC3. In another embodiment, each of the hosts 130 at each of the data centers 502 stores this information, and the host 130 at data center DC1 may apply the key to both the upper level ring 504 and the lower level ring 184.

In an embodiment, the data set may be pre-fetched when the connection with user computer 102 is established. For example, in the context of the shopping cart example of FIG. 2, a user computer 102 may establish a connection with host 534, but it may be some time before a request for the shopping cart data set is made. For example, the user may shop for a time before performing an action that necessitates accessing the shopping cart data set. The data set may therefore be pre-fetched by performing a read operation from the remote data centers 502 as soon as the connection is established with user computer 102 is established, without waiting for the user to perform an action which necessitates accessing the shopping cart data set. As a result, a local copy of the data set may be immediately available when the user performs an action which necessitates accessing the shopping cart data set. This arrangement may be used to avoid network latency associated with obtaining the data set by way of the communication network 508.

At step 616, the remote data centers 502 process the access request and transmit a response, which is received by host 130 at data center DC1. In an embodiment, in order for a read operation to be successful, the read operation must be successful at $R_{DC}$ data centers, where $R_{DC}$ is a configurable value and $R_{DC} \leq M$. In an embodiment, in order for a write operation to be considered successful, the write operation must be successful at $W_{DC}$ data centers, where $W_{DC}$ is a configurable value and $W_{DC} \leq M$. Setting the values $R_{DC}$ and $W_{DC}$ such that $R_{DC} + W_{DC} > M$ yields a quorum-like system in which there is a configurably high probability of overlap between the set of data centers 502 that participate in read and write operations.

As will be appreciated, when accessing data sets from data centers 502, data sets need not be written to and read from the same set of data centers 502, as described above with regard to hosts 130. For example, a data set may be written to data centers 502 which are further down on the preference list 519, migrated through data hand-off to data centers 502 that are higher on the preference list 519, and then ultimately read from the data centers 502 that are higher on the preference list 519. In this manner, eventual consistency of the data set at the top M data centers in the preference list 519 may be achieved. Data centers 502 may also periodically perform low level database comparisons of ranges they share in common, and then perform necessary data transfers to reconcile any differences detected during the comparison (e.g., due to lost copies of data sets). Thus, the data set service 112 may make an ongoing attempt to dynamically migrate copies of the most recent versions of data sets to the top M data centers in their preference lists 519. Even though copies of the most recent version of a data set may initially be copied at data centers 502 which are lower in its preference list 519, or may for another reason become lost at one of the top M data centers, the copies eventually migrate back to the top M data centers in the preference lists 519, resulting in eventual consistency of the data set at the top M data centers.

At step 618, the version histories for all the data sets received from the various hosts 130 and data centers 502 are compared to check consistency between data sets received from different data centers. In an embodiment, the version histories are vector clocks, and the vector clock arrangement as described above in connection with FIG. 16 is used to capture causality relations between different versions of the same data set stored at different data centers 502. For example, every host 130 may be given a universally unique <Host ID> parameter, e.g., such that any given two hosts 130 may be distinguished from each other, even if they are in different centers. In such an arrangement, the logic that is used to perform data versioning need not necessarily be cognizant of (or otherwise take into account) the fact that the hosts 130 are organized according to a multi-tiered ring arrangement. In another embodiment, data versioning is performed separate at the level of lower level ring 184 and at the level of upper level ring 504. In such an embodiment, the vector clock may include a <data center ID> parameter which indicates the data center that coordinated the write operation.

Figure 24:
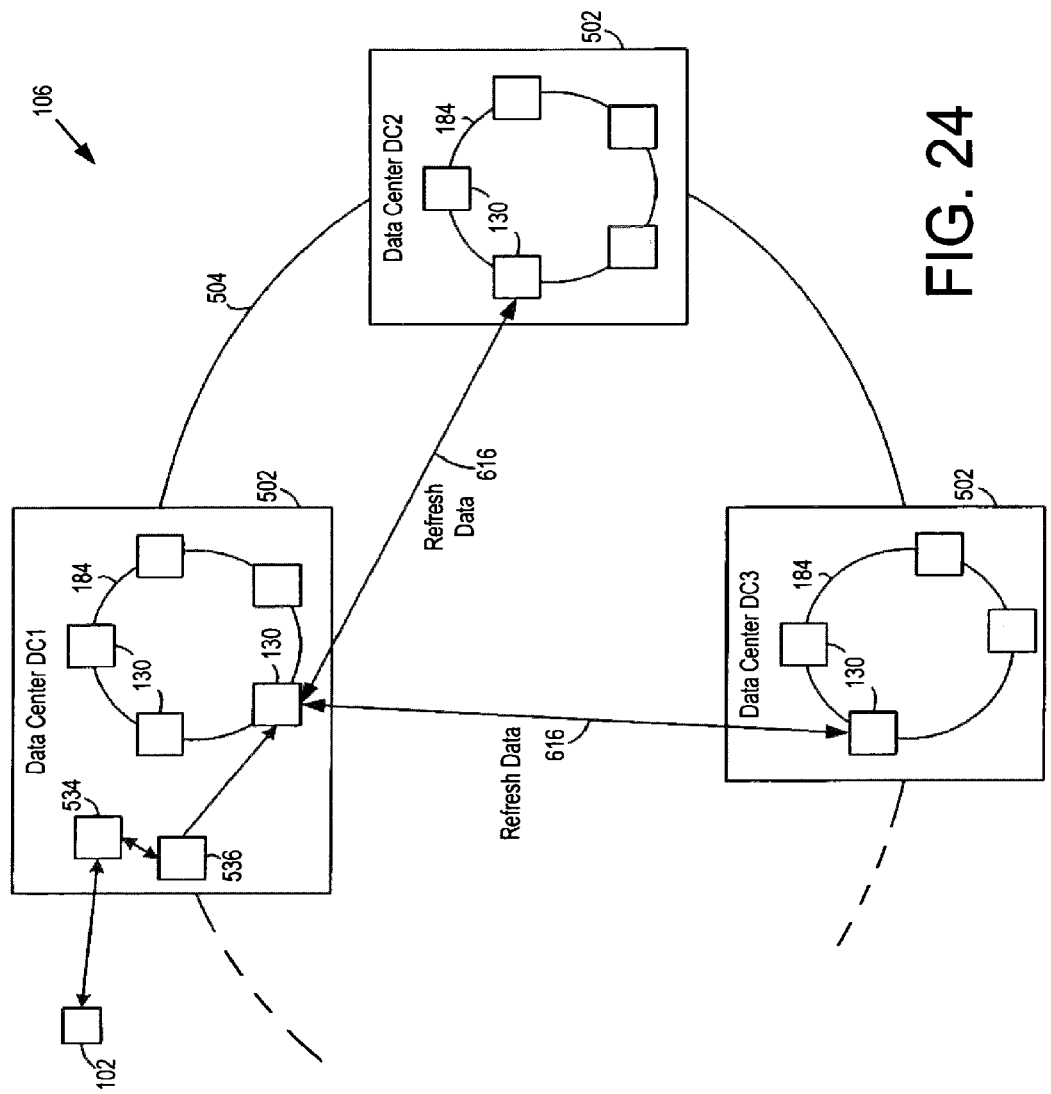

At step 620, with reference to FIG. 24, the data set is refreshed at the remote data centers. In an embodiment, once the data set is obtained, the data set is retained in the data center DC1 for a period of time (referred to herein as a "lease time"). Subsequently, future read operations are performed locally provided the lease has not expired. For example, when the data center receives a read to a data set, it returns the data set from a local host 130, without transmitting a read request to remote data centers 502. With regard to write operations, in an embodiment, write operations may be controlled using a message filter, as described below. In another embodiment, write operations may be performed using the same lease arrangement as described above for read operations. That is, when it receives an update to the data set, the host 130 performs the update locally and propagates the updates asynchronously to the other data centers 502 only upon expiration of the lease. By operating on the local copy of the data set, latency experienced at user computer 102 is reduced. In another embodiment, neither a message filter nor a lease arrangement is used, and updates are immediately propagated to the other data centers 502.

In the context of a network service, for example, a retail website, the lease time may be determined based on the average session time of user computers 102 and extended if the a session with a user computer 102 is active. However, during this lease time it is also possible for conflicts to arise in different copies of the data set if the data set is being accessed at multiple data centers simultaneously (e.g., if multiple user computers 102 are accessing the same data set at different data centers). In such situations, it may be desirable to refresh the local copy (as shown in FIG. 24) and synchronize the local copy with other replica copies maintained at other data centers. To the extent that conflicts arise in the data set stored at different data centers 502, such conflicts may be resolved by data set version reconciliation logic 136.

C. Message Filter Operations

Figure 25:
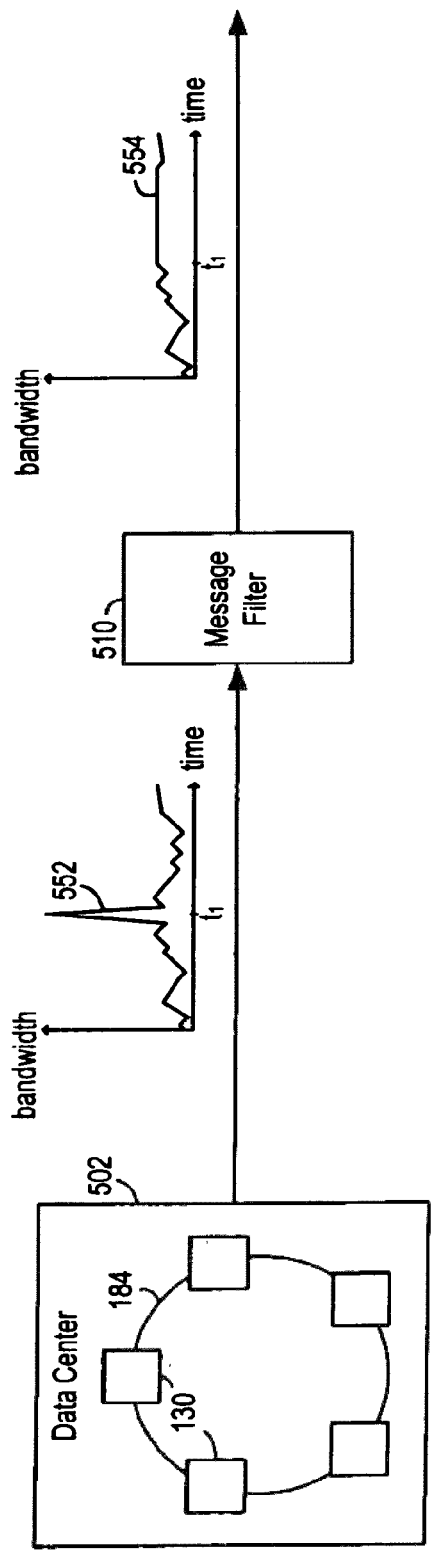
FIG. 25 is a message filter used in the system of FIG. 17 according to an embodiment.

Referring now to FIG. 25, in an embodiment, it may be desirable to reduce communication overhead across data centers while still meeting a desired level of availability, e.g., if the cost of storing data in the data centers is impacted by the level of network traffic (e.g., peak network traffic, average network traffic, and so on). For example, it may be desirable to avoid immediate propagation of data sets to other data centers so that traffic bursts are smoothened.

To this end, message filters 510 in each of the data centers 502 may be used to modulate network traffic. Each message filter 510 may be logically centralized in the corresponding data center 502. The message filter 510 may be configured to receive write requests from hosts 130 within the data center 502 and propagate the write requests immediately or in a delayed fashion. As shown in FIG. 25, data center 502 generates network traffic with a burst 552. The message filter 510 operates to smoothen the burst and create a bandwidth profile 554 in which the network traffic is spread out over a period of time. As another example, the message filter 510 may be configured to discard older versions of the data set (based on an analysis of the vector clocks) and forward only the most recent version of the data set. Message filter 510 may also be configured to operate as a reliable message storage system. For example, if a data center 502 is down or unavailable to receive message(s), then the message filter 510 may be configured to store the message and send the message when the data center 502 is back online.

The invention is described above with reference to drawings. These drawings illustrate certain details of specific embodiments that implement the systems, methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the invention are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Accordingly, the user computers 102 depicted in FIG. 1 may include, but are not limited to, desktop computers, laptop computers, set-top boxes, personal digital assistants, cellular telephones, media players, web pads, tablets, etc. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules, and other data for the computer.

It should be noted that although the flowcharts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps. It should also be noted that the word "engine" as used herein and in the claims is intended to encompass implementations using one or more lines of software code, and/or hardware implementations, and/or equipment for receiving manual inputs. Components such as engines, interfaces, databases, browsers, and so on, may be in communication with each other either because such components are provided in integral fashion because they are in communication with each other through a communication link, such as a network, and/or for other reasons.

The foregoing description of embodiments of the invention have been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

What is claimed is:

1. A computer-implemented data storage system comprising:
    mapping logic implemented by one or more hardware processors configured to execute instructions for the mapping logic stored in memory, the mapping logic configured to map responsibility for storing a plurality of data sets to a plurality of data centers, wherein the plurality of data centers include a plurality of hosts for maintaining parts of the data sets;
    data set replication logic implemented by one or more hardware processors configured to execute instructions for the data set replication logic stored in memory, the data set replication logic configured to write a first plurality of copies of a data set at a first subset of the plurality of hosts within a first subset of the plurality of data centers;
    data set retrieval logic implemented by one or more hardware processors configured to execute instructions for the data set retrieval logic stored in memory, the data set retrieval logic configured to read a second plurality of copies of the data set at a second subset of the plurality of hosts within a second subset of the plurality of data centers; and
    data set comparison logic implemented by one or more hardware processors configured to execute instructions for the data set comparison logic stored in memory, the data set comparison logic configured to:
        evaluate causal relationships between elements of the second plurality of copies of the data set to provide a single copy of the data set, the evaluation of causal relationships including at least a determination of causal relationships between elements in the second plurality of copies of the data set that are not causal ancestors of other elements in the second plurality of copies of the data set; and
        cause reconciliation between at least two copies of the second plurality of copies, wherein respective elements of the at least two copies are determined not to be causal ancestors of one another.

2. The computer-implemented data storage system of claim 1, wherein at least one member in the first subset of data centers and the second subset of data centers are different.

3. The computer-implemented data storage system of claim 1, wherein the data set comparison logic is further configured to cause generation of the single copy of the data set based, at least in part, on the reconciliation between the at least two copies.

4. The computer-implemented data storage system of claim 1, wherein the reconciliation is based at least in part on data versioning information.

5. The computer-implemented data storage system of claim 1, wherein the reconciliation includes applying a default ordering on copies in the second plurality of copies of the data set.

6. The computer-implemented data storage system of claim 5, wherein the default ordering includes partial ordering.

7. The computer-implemented data storage system of claim 5, wherein the default ordering is based at least in part on changes identified in data versioning information.

8. The computer-implemented data storage system of claim 1, wherein the reconciliation includes merging copies in the second plurality of copies.

9. The computer-implemented data storage system of claim 8, wherein merging copies in the second plurality of copies of the data set is based at least in part on changes identified in data versioning information.

10. The computer-implemented data storage system of claim 1, wherein the first subset of the first subset of the plurality of hosts within the plurality of data centers comprises a set of one or more hosts in the first subset of the plurality of hosts within each data center of the first subset of the plurality of data centers.

11. The computer-implemented data storage system of claim 1, wherein reading a second plurality of copies of a data set at the second subset of the plurality of hosts within the first subset of the plurality of data centers includes reading data from a second ordered sequence of hosts.

12. A computer-implemented method comprising:
    obtaining a data set;
    writing a first plurality of copies of the data set at a first plurality of hosts within a first subset of a plurality of data centers;
    reading a second plurality of copies of the data set at a second plurality of hosts within a second subset of the plurality of data centers;

evaluating causal relationships between elements of the second plurality of copies of the data set, wherein evaluating causal relationships comprises at least determining causal relationships between elements in the second plurality of copies of the data set that are not causal ancestors of other elements in the second plurality of copies of the data set;

reconciling between at least two copies of the second plurality of copies, wherein the at least two copies comprise respective elements that are determined not to be causal ancestors of one another; and determining a single copy of the data set from the second plurality of copies of the data set based, at least in part, on the reconciling between the at least two copies.

13. The computer-implemented method of claim 12, wherein evaluating causal relationships is based at least in part on data versioning information.

14. The computer-implemented method of claim 12, wherein evaluating causal relationships includes applying a default ordering on copies in the second plurality of copies of the data set.

15. The computer-implemented method of claim 12, wherein determining a single copy of the data set includes merging copies in the second plurality of copies.

16. The computer-implemented method of claim 12, wherein at least one member in the first subset of data centers and the second subset of data centers are different.

17. The computer-implemented method of claim 12, wherein writing the first plurality of copies of the data set at the first plurality of hosts within the first subset of the plurality of data centers includes writing data to a first ordered sequence of hosts.

18. The computer-implemented method of claim 17, wherein reading the second plurality of copies of a data set at the second plurality of hosts within the second subset of the plurality of data centers includes reading data from a second ordered sequence of hosts.

19. A non-transitory, computer-readable medium containing computer-executable instructions, wherein the computer-executable instructions, when executed by a processor, cause the processor to:

read a plurality of copies of a data set at a plurality of hosts within a subset of a plurality of data centers;

evaluate causal relationships between elements of the plurality of copies of the data set, wherein evaluating causal relationships comprises at least evaluating causal relationships between elements in the second plurality of copies of the data set that are not causal ancestors of other elements in the plurality of copies of the data set; and determine a single copy of the data set from the plurality of copies of the data set based on the evaluated causal relationships between the elements of the plurality of copies of the data set.

20. The non-transitory, computer-readable medium of claim 19, wherein evaluating causal relationships further comprises applying partial ordering on copies in the plurality of copies of the data set.

* * * * *